(12) United States Patent
Kozuka

(10) Patent No.: US 12,358,198 B2
(45) Date of Patent: Jul. 15, 2025

(54) INJECTION MOLDING MACHINE EQUIPPED WITH SUPPORT DEVICE

(71) Applicant: Nissei Plastic Industrial Co., Ltd., Nagano (JP)

(72) Inventor: Makoto Kozuka, Hanishina-gun (JP)

(73) Assignee: Nissei Plastic Industrial Co., Ltd., Nagano (JP)

(*) Notice: Subject to any disclaimer, the term of this patent is extended or adjusted under 35 U.S.C. 154(b) by 449 days.

(21) Appl. No.: 17/797,562

(22) PCT Filed: Feb. 5, 2021

(86) PCT No.: PCT/JP2021/004465
§ 371 (c)(1),
(2) Date: Aug. 4, 2022

(87) PCT Pub. No.: WO2021/157737
PCT Pub. Date: Aug. 12, 2021

(65) Prior Publication Data
US 2023/0075070 A1    Mar. 9, 2023

(30) Foreign Application Priority Data

Feb. 5, 2020   (JP) .............................. 2020-018255
Dec. 25, 2020  (WO) ................ PCT/JP2020/048755

(51) Int. Cl.
*B29C 45/76*    (2006.01)

(52) U.S. Cl.
CPC .... *B29C 45/766* (2013.01); *B29C 2045/7606* (2013.01); *B29C 2945/76913* (2013.01)

(58) Field of Classification Search
None
See application file for complete search history.

(56) References Cited

U.S. PATENT DOCUMENTS 5,173,223 A * 12/1992 Kamiguchi ........... B29C 45/768
                                                     425/149
2011/0215496 A1* 9/2011 Ogura ..................... B29C 45/76
                                                     264/328.1

(Continued)

FOREIGN PATENT DOCUMENTS

JP     2002-67109 A     3/2002
JP     2003-340891 A    12/2003

(Continued)

OTHER PUBLICATIONS

English translation of Nakagawa et al. Japanese Patent Publication No. 2015123668, published 2015.*

(Continued)

*Primary Examiner* — Bernard G Lindsay
(74) *Attorney, Agent, or Firm* — Sughrue Mion, PLLC

(57) ABSTRACT

An injection molding support device including a setting unit that sets basic information such as resin material data, screw data, and heating cylinder data, and sets constraint information such as a constraint condition for obtaining an optimum condition, a computation unit that computes an estimated solid phase rate of the resin material on the basis of the basic information and the constraint information by a high-speed computation method using an optimum mathematical processing system, and a display unit that displays a decision index in accordance with a value of the estimated solid phase rate. The estimated solid phase rate is the estimated solid phase rate of the resin material at the screw tip end.

11 Claims, 15 Drawing Sheets

(56) References Cited

U.S. PATENT DOCUMENTS

| | | | | |
|---|---|---|---|---|
| 2012/0310603 A1* | 12/2012 | Hansen | ................. | B22D 17/32 |
| | | | | 703/1 |
| 2016/0297130 A1* | 10/2016 | Esser | ................. | B29C 45/2725 |
| 2018/0029272 A1* | 2/2018 | Tobita | ..................... | B29C 45/66 |
| 2020/0198201 A1* | 6/2020 | Shimokusuzono | ... | B29C 45/766 |
| 2021/0001528 A1 | 1/2021 | Kozuka | | |

FOREIGN PATENT DOCUMENTS

| | | |
|---|---|---|
| JP | 2015-123668 A | 7/2015 |
| JP | 2020-1183 A | 1/2020 |
| WO | 2019/188998 A1 | 10/2019 |

OTHER PUBLICATIONS

Pandelidis et al. 'Optimization of Injection Molding Design. Part II: Molding Conditions Optimization' Polymer Engineering and Science, Mid-Aug. 1990, vol. 30, pp. 883-892, published 1990.*

International Search Report dated Mar. 30, 2021 in International Application No. PCT/JP2021/004465.

International Preliminary Report on Patentability dated Jul. 28, 2022 in International Application No. PCT/JP2021/004465.

Written Opinion dated Mar. 30, 2021 in International Application No. PCT/JP2021/004465.

Extended European Search Report dated Jul. 5, 2023 in European Application No. 21750191.5.

* cited by examiner

FIG.9

| | OPTIMUM MATHEMATICAL SYSTEM | | CONSTRAINT CONDITION | |
|---|---|---|---|---|
| | DO NOT USE | USE | MIN | MAX |
| (G) REVOLUTION SPEED (rpm) | ○ | ● | 50 | 200 |
| (J) BACK PRESSURE (MPa) | ○ | ● | 5 | 25 |
| (K) MEASUREMENT POSITION (mm) | ● | ○ | | |
| (L) CYCLE TIME (s) | ○ | ● | 50 | 55 |
| (M) INJECTION TIME (s) | ○ | ● | 5 | 20 |
| (N TO R) SET TEMPERATURES (°C) | ○ | ● | 180 | 220 |
| (S) DROP INLET SET TEMPERATURE (°C) | ○ | ● | 25 | 100 |
| (T) HOPPER SET TEMPERATURE (°C) | ○ | ● | 25 | 100 |

FIG.10

```
OPTIMUM VALUE
BACK PRESSURE: 10.3 MPa
MEASURED VALUE: 50 mm
REVOLUTION SPEED: 50 rpm
CYCLE TIME:50 s
INJECTION TIME: 5 s
SET TEMPERATURE: (NOZZLE SIDE) 220°C, 215°C, 210°C, 205°C, 200°C
(HOPPER SIDE)
DROP INLET TEMPERATURE: 25°C
HOPPER TEMPERATURE: 34.5°C
```

INJECTION MOLDING MACHINE EQUIPPED WITH SUPPORT DEVICE

FIELD OF THE INVENTION

The present invention relates to an injection molding support device and an injection molding machine equipped with the same. More specifically, the present invention relates to an injection molding support device that is capable of providing support in determining whether or not a setting condition at the time of injection filling is a condition that places a resin material in an appropriate plasticized state when the resin material, measured and plasticized, is molded by being injection-filled from a screw tip end into a mold, and/or is capable of presenting an optimum condition at the time of injection filling, and an injection molding machine equipped with the same.

BACKGROUND ART

An injection molding machine is a device that molds measured and plasticized resin material (hereinafter also referred to as "molten resin") by injection-filling the resin material into a mold by means of a screw. Therefore, injection filling with the molten resin in a proper state is important to obtain quality molded products. In a case in which the plasticization of the resin material progresses excessively before injection filling, thermal decomposition of the resin material may occur, resulting in alteration (carbonization and the like) of the resin material and generation of unnecessary gases.

These problems are closely related to the plasticization time, heating conditions, and the like of the resin material to be plasticized in the screw. In a case in which the plasticization of the resin material progresses excessively due to a prolonged plasticization time or inappropriate heating conditions, a problem arises in which a decomposition rate of the resin material increases. To solve this problem, several technologies have been proposed to reduce the decomposition rate of resin material by monitoring the plasticized state of the resin material in the screw. On the other hand, ensuring a proper plasticization time and maintaining the unmolten polymer fraction (an indicator of how much solid material remains after a series of processes) of the resin material below a certain level are important for reducing defects in molded products because this can stabilize the plasticized state of the resin material. For this reason, techniques have been proposed to ensure a proper plasticized state.

For example, Patent Document 1 proposes a plasticization control device for an injection molding machine that can accurately determine whether or not the plasticized state is stable. This plasticization control device is provided with a current detection means for detecting a driving current of a plasticization motor that rotates a screw during a measurement operation, a rotational speed detection means for detecting a rotational speed of the plasticization motor, torque calculation means for calculating a driving torque of the plasticization motor from the driving current of the motor, and computation means for computing an instantaneous value of drive power of the plasticization motor on the basis of the calculated driving torque and the detected rotational speed of the motor, and further includes an integrator that integrates the computed instantaneous value of the drive power during the plasticization time.

Further, Patent Document 2 proposes an injection molding machine equipped with a means for estimating the plasticization time. This injection molding machine is a standard injection molding machine with a known ideal plasticizing capacity, which is a throughput per hour when continuously plasticizing a specific resin material. Then, the injection molding machine injection-molds any resin material, measures an amount of substance in one shot on the basis of a weight of the obtained molded product, and measures the plasticization time at that time. The injection molding machine then includes a storage unit that, upon calculating a plasticization work rate by substituting the actual amount of one shot, the plasticization time, and the known ideal plasticizing capacity into a computation formula for finding the plasticization work rate, implementing the same calculation for other types of resin materials as well, and creating a correlation map between the types of resin material and the plasticization work rates, stores the correlation. Further, the injection molding machine includes an input unit for inputting the type of resin material to be used in an injection molding machine different from a standard injection molding machine, a cavity volume of the mold, and the known ideal plasticizing capacity of the different injection molding machine. Further, the injection molding machine includes a computation unit that estimates the plasticization time by selecting the plasticization work rate from the correlation map with the type of resin material to be used in this other injection molding machine, estimating the weight of one shot from the cavity volume of the mold and the density of the resin material to be used, and substituting the plasticization work rate, weight of one shot, and the known ideal plasticizing capacity of the other injection molding machine into the computation formula for the plasticization time. Furthermore, the injection molding machine includes a display unit that displays the plasticization time estimated by this computation unit.

Further, Patent Document 3 proposes a molding support device of an injection molding machine used to provide molding support for an injection molding machine that molds plasticized molten resin by injection-filling the resin material into a mold by means of a screw. This molding support device includes a computation processing function unit and an output processing function unit. The computation processing function unit includes a basic data input unit that inputs basic data including molding condition data related to molding conditions and screw data related to a screw form by a proprietary injection molding theoretical formula, a computation formula data setting unit that sets solid phase rate computation formula data for computing an estimated solid phase rate of the molten resin in the heating cylinder on the basis of this basic data, and a solid phase rate computation processing unit that finds the estimated solid phase rate of the molten resin upon completion of measurement by computation processing based on the basic data and the solid phase rate computation formula data. The output processing function unit displays information related to the estimated solid phase rate on a display.

PRIOR ART DOCUMENTS

Patent Documents

Patent Document 1: Japanese Laid-Open Patent Application Publication No. 2003-340891
Patent Document 2: Japanese Laid-Open Patent Application Publication No. 2002-067109

Patent Document 3: International Publication WO2019/188998A1

SUMMARY OF THE INVENTION

Problems to be Solved by the Invention

In both cases of the above-described Patent Documents 1 and 2, the plasticization time is ascertained on the basis of indirect physical quantities obtained from the operating state of the injection molding machine, and thus the devices only operate with the plasticization time as rough information, and not on the basis of an exact plasticization time. Therefore, there is a limit in the devices to setting a proper plasticization time and maintaining the unmolten fraction (solid phase rate) of the resin material below a certain level to reduce plasticization defects. Further, because the plasticization time is ascertained on the basis of information obtained from the actual operating state of the injection molding machine, there are drawbacks such as an increase in man-hours and waste of resin material, making it difficult to use the devices as molding support devices and making the work process cumbersome. In particular, it is difficult to accurately and easily reflect molding conditions based on the information actually obtained, and conditions have to be set for each injection molding machine, making versatility and expandability as a molding support device difficult to achieve.

Further, in Patent Document 3, the estimated solid phase rate at the time of melting is calculated to simulate the plasticized state of the resin material, the calorific value of the resin material and the unmolten polymer fraction and carbonization rate are subsequently calculated, and an added value obtained by making this a dimensionless solution is computed as a "resin temperature stability." As a result, a correlation of the actual measurement value with respect to the calculated value is a high 0.77, but such a calculation method requires at least 20 seconds of calculation time, which needs to be shortened.

The present invention has been made to solve the above-described problems, and an object thereof is to provide an injection molding support device that is capable of providing support in determining whether or not a condition at the time of injection filling is a condition that places a resin material in an appropriate plasticized state when the resin material, measured and plasticized, is molded by being injection-filled from a screw tip end into a mold, and/or is capable of presenting an optimum condition at the time of injection filling, and an injection molding machine equipped with the same.

Means for Solving the Problems

Research of the present inventors conducted to date has shown that calculating the "calorific value of material in a heating cylinder (screw)" is one factor in determining a melted state of a resin material, but such calculation procedures require time for computation. In the present invention, provided is an injection molding support device that, instead of using a calculation method based on calorific value, (a) can determine in a short time whether or not a setting condition for placing a resin material at the time of injection filling in a plasticized state is an appropriate value, and (b) can present in an extremely short time the condition for placing the resin material at the time of injection filling in an optimum plasticized state (referred to as optimum condition) by a high-speed computation method that uses an optimum mathematical processing system.

(1) An injection molding support device according to the present invention is an injection molding support device capable of providing support in determining whether or not a condition at the time of injection filling is a condition that places a resin material in an appropriate plasticized state when the resin material, measured and plasticized, is molded by being injection-filled from a screw tip end into a mold.

The injection molding support device comprises a setting unit that sets basic information including at least resin material data related to the resin material, screw data related to the screw, heating cylinder data related to a heating cylinder, and condition data related to a condition at the time of the injection filling; a computation unit that computes an estimated solid phase rate of the resin material on the basis of the basic information; and a display unit that displays a decision index in accordance with a value of the estimated solid phase rate.

According to this invention, it is possible to present an index for determining whether or not a condition at the time of injection filling is a condition that places the resin material in an appropriate plasticized state. In particular, by setting each condition as basic information and determining, as a decision index, whether or not the estimated solid phase rate is an appropriate value (for example, 0 or a value close to 0) utilizing the estimated solid phase rate obtained by a proprietary injection theoretical formula, it is possible to present the decision index in an extremely short time (for example, 0.1 seconds or less) and use the decision index as an effective decision-making factor for a work operator. Then, when that basic information is used as a specific condition currently being performed or about to be performed, the information can be utilized to determine the level of the condition.

In the injection molding support device according to the present invention, the estimated solid phase rate is the estimated solid phase rate of the resin material at the screw tip end. According to this invention, determining whether or not the estimated solid phase rate of the resin material at the screw tip end is an appropriate value (for example, 0 or a value close to 0) is the decision index.

In the injection molding support device according to the present invention, the estimated solid phase rate is displayed as a profile composed of two or more estimated solid phase rates including at least a first estimated solid phase rate of the resin material at the screw tip end and a second estimated solid phase rate of the resin material not at the screw tip end. According to this invention, when the basic information composed of various data is used as a specific condition currently being performed or about to be performed, it is possible to view the displayed profile composed of two or more estimated solid phase rates and thus utilize the information to determine the level of the condition. Although such a display unit may display only the first estimated solid phase rate and the second estimated solid phase rate, or may display even other estimated solid phase rates, according to this invention, the estimated solid phase rate including the first estimated solid phase rate and the second estimated solid phase rate may be displayed as a profile in whole or may be displayed as a profile in part, thereby making it possible for the work operator to easily check the information visually.

It should be noted that the decision index displayed on the display unit is displayed as dimensionless resin temperature stability. In this way, the displayed dimensionless resin temperature stability can be used as a decision index, and the plasticized state can be determined to be appropriate to the extent that the value of the resin temperature stability is low.

(2) An injection molding support device according to the present invention is an injection molding support device capable of presenting an optimum condition at the time of injection filling when a resin material, measured and plasticized, is molded by being injection-filled from a screw tip end into a mold.

The injection molding support device comprises a setting unit that sets basic information including at least resin material data related to the resin material, screw data related to the screw, and heating cylinder data related to a heating cylinder, and sets constraint information related to a constraint condition for obtaining the optimum condition; a computation unit that computes an estimated solid phase rate of the resin material on the basis of the basic information and the constraint information by a high-speed computation method using an optimum mathematical processing system; and a display unit that displays a decision index in accordance with a value of the estimated solid phase rate.

According to this invention, it is possible to compute the optimum condition that achieves an appropriate plasticized state within a range of the constraint condition by the high-speed computation method using the optimum mathematical processing system, and present a decision index in accordance with the determined result. In particular, computation is performed within the range of the constraint condition by the high-speed computation method using the optimum mathematical processing system, making it possible to use the computation result as an effective decision-making factor for the work operator.

In the injection molding support device according to the present invention, the estimated solid phase rate is the estimated solid phase rate of the resin material at the screw tip end. According to this invention, determining whether or not the estimated solid phase rate of the resin material at the screw tip end is an appropriate value (for example, 0 or a value close to 0) is the decision index.

In the injection molding support device according to the present invention, the estimated solid phase rate is displayed as a profile composed of two or more estimated solid phase rates including at least a first estimated solid phase rate of the resin material at the screw tip end and a second estimated solid phase rate of the resin material not at the screw tip end. According to this invention, with the profile composed of two or more estimated solid phase rates displayed on the basis of the basic information and the constraint information, it is possible to utilize the optimum condition displayed within the range of the information as a decision index during actual molding. Although such a display unit may display only the first estimated solid phase rate and the second estimated solid phase rate, or may display even other estimated solid phase rates, according to this invention, the estimated solid phase rate including the first estimated solid phase rate and the second estimated solid phase rate may be displayed as a profile in whole or may be displayed as a profile in part, thereby making it possible for the work operator to easily check the information visually.

In the injection molding support device according to the present invention, the computation unit performs a computation for setting only the value of the first estimated solid phase rate to 0 or close to 0. According to this invention, computation for setting only the value of the first estimated solid phase rate to 0 or close to 0 is performed, making it possible to use the optimum condition that leads to this computation result as a setting condition.

It should be noted that the decision index displayed on the display unit is displayed as dimensionless resin temperature stability. In this way, the displayed dimensionless resin temperature stability can be used as a decision index, and the plasticized state can be determined to be appropriate to the extent that the value of the resin temperature stability is low.

In the injection molding support device according to the present invention, the setting unit includes at least a first setting unit that sets one or two or more data selected from the basic information, and a second setting unit that sets whether or not one or two or more data selected from the basic information is to be applied to the high-speed computation method as the constraint condition, and in a case in which the data is to be applied, sets a range of the constraint condition. According to this invention, the setting unit can set information in each of the first setting unit and the second setting unit as necessary, making it possible to input constraint conditions in accordance with specifications such as characteristics of the injection molding machine and the type of resin material, and support the decision-making of the work operator on the basis of the optimum conditions presented as the conditions suitable for the specifications.

In the injection molding support device according to the present invention, the computation of the estimated solid phase rate is performed by a nonlinear analysis method. According to this invention, it is possible to calculate the estimated solid phase rate in an extremely short time, even when computed using a nonlinear analysis method.

In the injection molding support device according to the present invention, the computation unit recalculates the estimated solid phase rate on the basis of the estimated solid phase rate as necessary, and displays the recalculated estimated solid phase rate on the display unit. According to this invention, it is possible to recalculate the estimated solid phase rate as necessary, and display the recalculated estimated solid phase rate on the display unit.

In the injection molding support device according to the present invention, a function of the injection molding support device of (1) described above is provided. According to this invention, this injection molding support device of (2) is provided with the function of the injection molding support device of (1) described above, making it possible to support a determination of whether or not a condition at the time of injection filling is an appropriate value, and support presentation of an optimum condition at the time of injection filling.

(3) An injection molding machine according to the present invention comprises the injection molding support device according to the above-described present invention.

Effect of the Invention

According to the present invention, it is possible to provide an injection molding support device that is capable of supporting a determination of whether or not a condition at the time of injection filling is an appropriate value, and/or is capable of presenting an optimum condition at the time of injection filling, and an injection molding machine equipped with the same. According to this injection molding support device, it is possible to determine whether or not a condition achieves an "appropriate plasticized state" that can, for example, reduce molding defects such as resin burns, short shots, or welds, reduce galling, reduce molded product mechanical properties, reduce screw maintenance, reduce gas adhesion to the mold, or the like, or to calculate a condition setting in an extremely short time that achieves an "appropriate plasticized state," and to display that the resin material is in an "appropriate plasticized state" in an extremely short time to the work operator.

BRIEF DESCRIPTION OF THE DRAWINGS

FIG. 9 is an example of a setting unit (second setting unit) that sets whether or not one or two or more data selected from the basic information are to be applied to the high-speed computation method as constraint conditions and, in a case in which the data is to be applied, sets ranges of the constraint conditions.

FIG. 10 is a display example of the results of a computation performed by the high-speed computation method (nonlinear analysis) using the optimum mathematical processing system to ensure that the conditions at the time of injection filling are optimum conditions that place the resin material in an appropriate plasticized state, on the basis of input information of the setting unit illustrated in FIG. 9.

EMBODIMENTS OF THE INVENTION

Figure 1A:
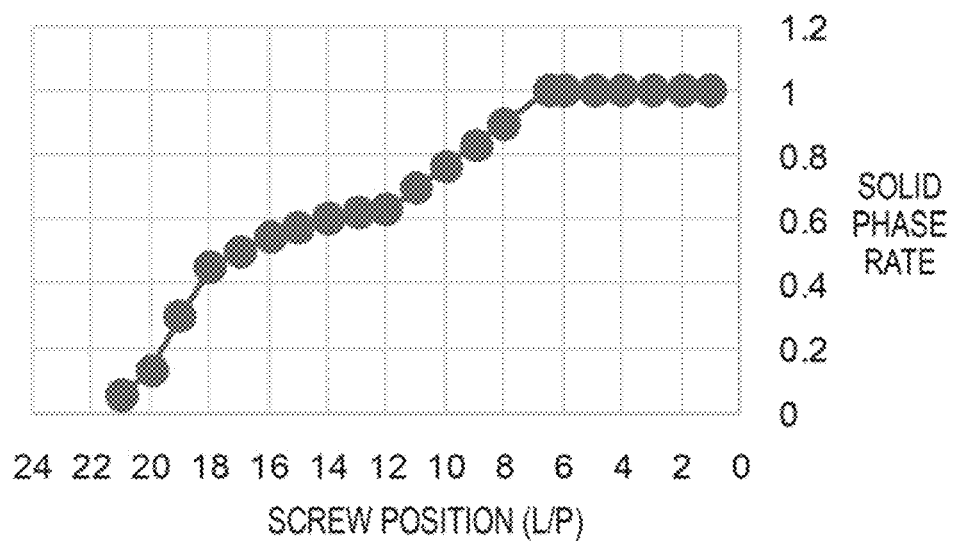
FIGS. 1A and 1B respectively show, when a substitute mold is injection-filled under conditions of experiment 1, an estimated solid phase rate computation result indicating a preferred plasticized state of a resin material, and measurement results of a resin temperature when the substitute mold was injection-filled.

The following describes an injection molding support device according to the present invention and an injection molding machine equipped with the same, with reference to the drawings. It should be noted that the following descriptions and drawings are examples for implementing the present invention, and all devices that include the gist of the present invention are included in the scope of the invention.

An injection molding support device according to the present invention is a device that, as illustrated in FIG. 1A to FIG. 11 and the like, (a) can determine in a short time whether or not a setting condition for placing a resin material at the time of injection filling in a plasticized state is an appropriate value, and (b) can present in an extremely short time a condition for placing the resin material at the time of injection filling in an optimum plasticized state (referred to as optimum condition) by a high-speed computation method that uses an optimum mathematical processing system. It should be noted that the term "plasticized state" refers to the resin material being in a "measured and plasticized state" and is expressed as "measured and plasticized."

The injection molding support device of (a) includes a setting unit that sets basic information including at least resin material data related to the resin material, screw data related to the screw, heating cylinder data related to a heating cylinder, and condition data related to a condition at the time of the injection filling; a computation unit that computes an estimated solid phase rate of the resin material on the basis of the basic information; and a display unit that displays a decision index in accordance with a value of the estimated solid phase rate. This injection molding support device can be referred to as an injection molding support device for molding condition confirmation.

With this injection molding support device, it is possible to present an index for determining whether or not a condition at the time of injection filling is a condition that places the resin material in an appropriate plasticized state. In particular, by setting each condition as basic information and determining, as a decision index, whether or not the estimated solid phase rate of the resin material at a screw tip end is an appropriate value (for example, 0 or a value close to 0) utilizing the estimated solid phase rate obtained by a proprietary injection theoretical formula, it is possible to present the decision index in an extremely short time (for example, 0.1 seconds or less), and use the decision index as an effective decision-making factor for a work operator.

The injection molding support device of (b) includes a setting unit that sets basic information including at least resin material data related to the resin material, screw data related to the screw, and heating cylinder data related to a heating cylinder, and sets constraint information related to a constraint condition for obtaining the optimum condition; a computation unit that computes an estimated solid phase rate of the resin material on the basis of the basic information and the constraint information by a high-speed computation method using an optimum mathematical processing system; and a display unit that displays a decision index in accordance with a value of the estimated solid phase rate. This injection molding support device can be referred to as an injection molding support device for optimum condition presentation.

With this injection molding support device, it is possible to compute the optimum condition that achieves an appropriate plasticized state within a range of the constraint condition by the high-speed computation method using the optimum mathematical processing system, and present a decision index in accordance with the determined result. In particular, computation is performed within the range of the constraint condition by the high-speed computation method using the optimum mathematical processing system, making it possible to use the computation result as an effective decision-making factor for the work operator.

Figure 12:
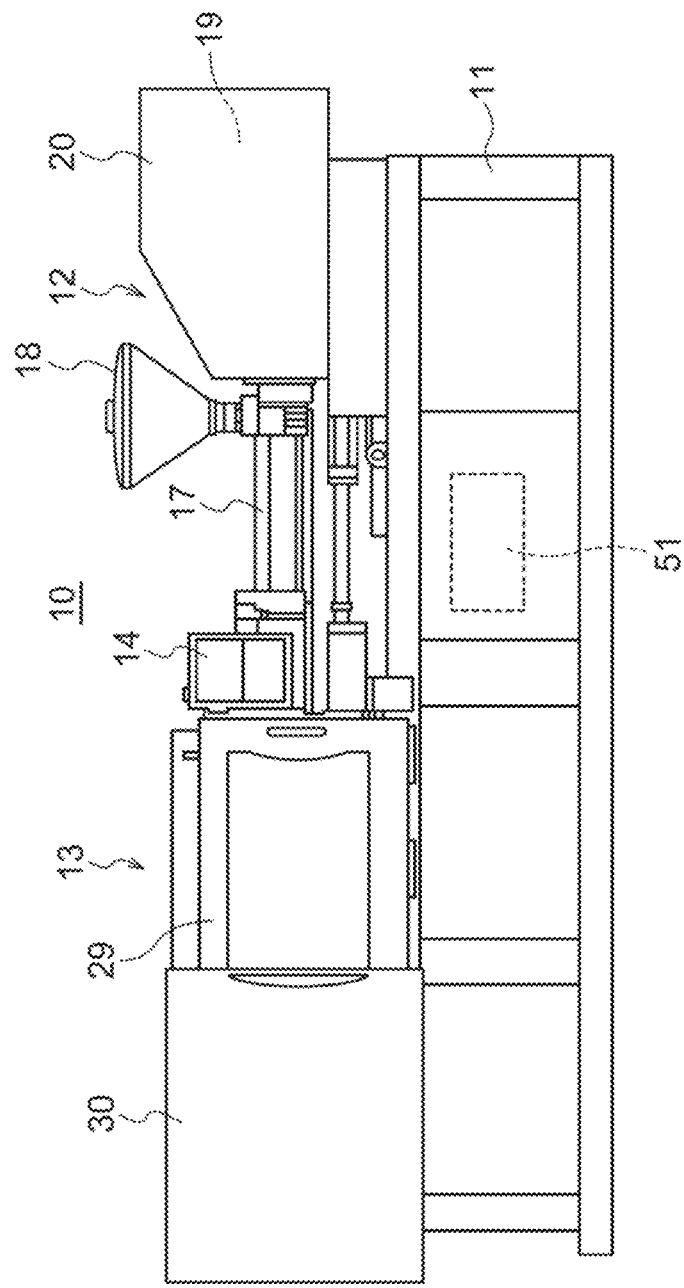
FIG. 12 is a schematic diagram of an injection molding machine.
Figure 13:
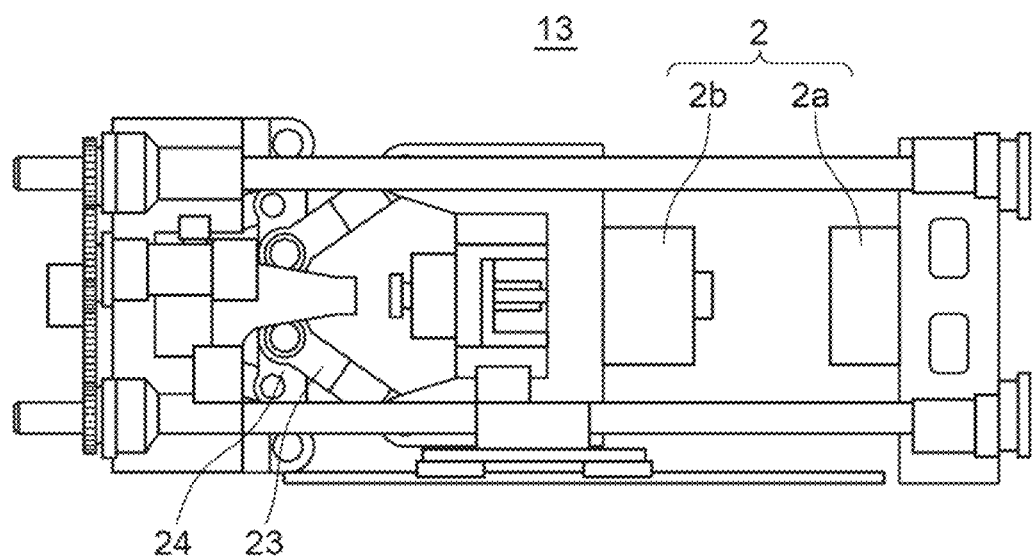
FIG. 13 is a form diagram illustrating an example of an injection mold.
Figure 14:
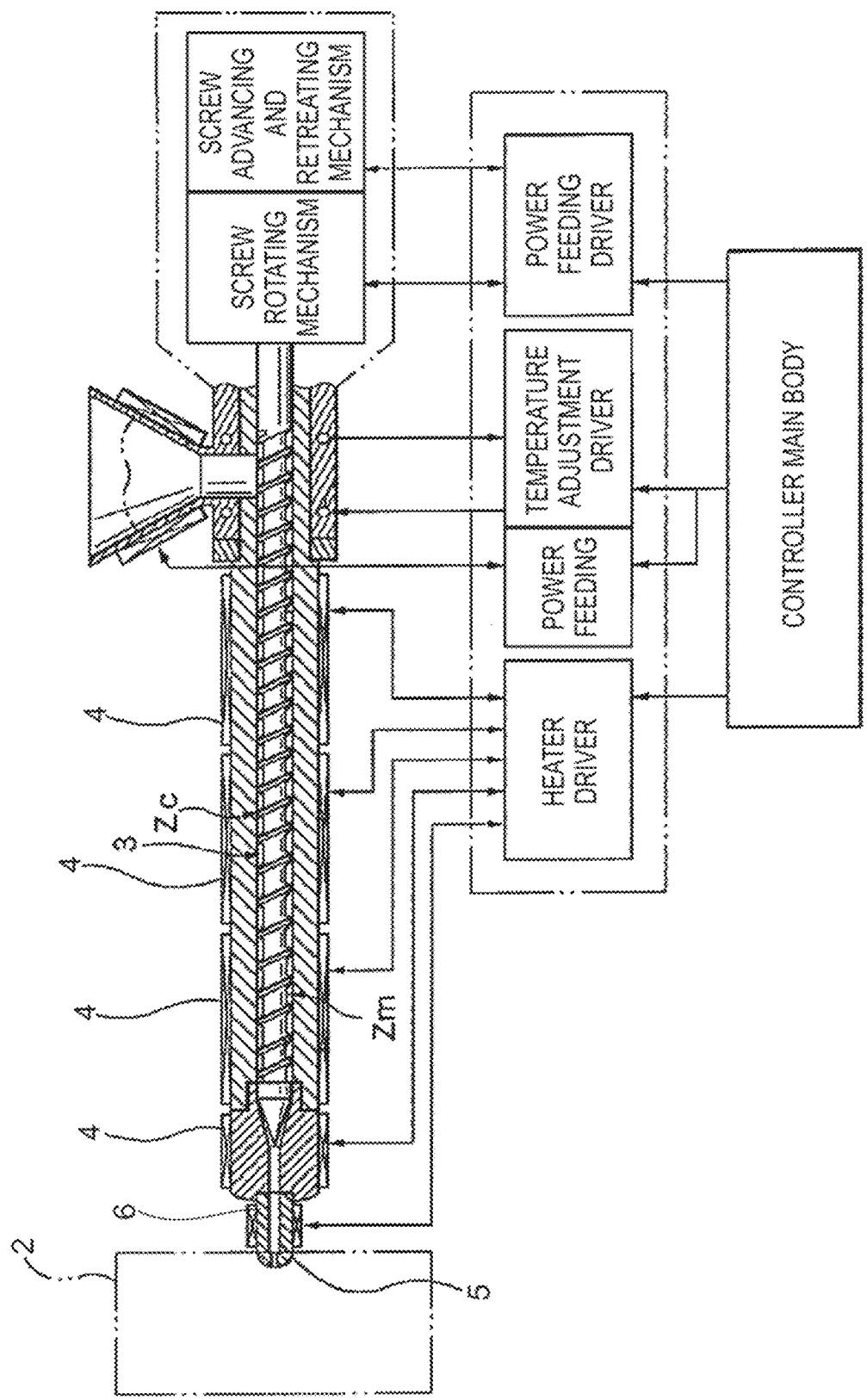
FIG. 14 is a form diagram illustrating an example of a screw.

The injection molding support device, as illustrated in FIG. 12 to FIG. 14, is a support device when a resin material, measured and plasticized, is molded by being injection-filled from a tip end 6 of a screw 3 into a mold 2. The injection molding support device is usually mounted to an actual injection molding machine 10 such as exemplified in FIG. 12, but need not be mounted to the injection molding machine 10, and may be, for example, a dedicated simulation device that simulates the plasticized state of a resin material.

This injection molding support device is a device for supporting the determination of whether or not a setting condition at the time of injection filling is a condition that places the resin material in an appropriate plasticized state and/or for presenting a condition for placing the resin material at the time of injection filling in an optimum plasticized state (optimum condition) by a high-speed computation method that uses an optimum mathematical processing system.

The term "at the time of injection filling" means that the resin material is in a plasticized state in the screw 3, and in a state immediately before the mold (actual mold or substitute mold; the same shall apply hereinafter) is filled therewith from the tip end 6 of the screw 3. The term "condition" refers to various conditions that affect the plasticized state. Examples include various conditions such as revolution speed (rpm) of the screw 3, back pressure (MPa) during injection filling, measurement position (mm) of the resin material, cycle time (seconds) of injection filling, injection filling time (seconds) of the resin material, set temperature (° C.) of each area of the screw 3, drop inlet set temperature (° C.), and hopper set temperature (° C.). The injection molding support device is (a) a device that, in a case in which a plurality of conditions selected from these conditions are set, computes whether or not the setting conditions are conditions that place the resin material in an appropriate plasticized state using a method based on an injection theoretical formula described below, and provides the result to the work operator for decision-making (also referred to as "injection molding support device for molding condition confirmation"), and/or (b) a device capable of presenting the conditions that place the resin material at the time of injection filling in an optimum plasticized state (optimum conditions) by a high-speed computation method that uses an optimum mathematical processing system (also referred to as an "injection molding support device for optimum condition presentation"). The term "appropriate plasticized state" refers to a state in which the estimated solid phase rate of the resin material at the tip end 6 of the screw 3 is an appropriate value (for example, 0 or a value close to 0), as described below.

The following describes the injection molding support device for molding condition confirmation and the injection molding support device for optimum condition presentation separately. It should be noted that the injection molding support device according to the present invention may be provided with only the function (described below) of the injection molding support device for molding condition confirmation of (a), only the function (described below) of the injection molding support device for optimum condition presentation of (b), or both of the functions of (a) and (b). In a case in which both of the functions are provided, it is possible to support a determination of whether or not a condition at the time of injection filling is an appropriate value, and support presentation of an optimum condition at the time of injection filling.

Injection Molding Support Device for Molding Condition Confirmation

Setting Unit/First Setting Unit

The setting unit (first setting unit) is a portion that sets basic information including at least resin material data related to the resin material, screw data related to the screw, heating cylinder data related to a heating cylinder, and condition data related to a condition at the time of injection filling (filling condition). Examples of the resin material data include resin material type, melt flow rate, specific heat data, thermal conductivity data, and the like. Examples of the screw data include screw length (mm), thread groove pitch (mm), revolution speed (rpm), groove depth (mm), radius of curvature (mm), and the like. It should be noted that the screw data also includes complexly shape elements such as sub-flights and variable pitch screws. Examples of the heating cylinder data include dimension information, materials, control point positions, heater length, heater position, wattage, and the like. Examples of the filling condition at the time of injection filling include the screw revolution speed (rpm) at the time of injection filling, the back pressure (MPa) during injection filling, the measurement position (mm) of the resin material, the cycle time (seconds) of injection filling, the injection time (seconds) of the resin material, the set temperature (° C.) of each area of the screw 3, the drop inlet set temperature (° C.), the hopper set temperature (° C.), and the plasticization time (seconds). In addition to the actual measurement value, a plasticization time considered an optimum value obtained by the injection molding support device for optimum condition presentation described below is applicable, and thus the plasticization time also includes a plasticization time considered the optimum value.

It should be noted that the data described above is not limited to those listed above and may be other data not listed. FIG. 9 is an example of the first setting unit that sets several conditions. This first setting unit is provided in combination with a second setting unit set by the injection molding support device for optimum condition presentation as described below, but the first setting unit set by the injection molding support device for molding condition confirmation may be provided alone.

The first setting unit is preferably provided on a display panel. A type of the display panel is not particularly limited, but a liquid crystal display panel that allows input by touch is convenient. A display panel 31 may be provided independently as a dedicated panel, or may be provided in a display device 14 of the injection molding machine 10 or as a separate unit connected to the display device 14, for example.

Computation Unit

The computation unit is a portion that computes the estimated solid phase rate of the resin material on the basis of the basic information. The estimated solid phase rate computed by this computation unit is obtained by using the estimated solid phase rate computed on the basis of the basic information, as illustrated in the flowchart in FIG. 5. Therefore, in a case in which that basic information is input as a specific condition currently being performed or about to be performed, the information can be utilized to determine the level of the condition.

The estimated solid phase rate is computed as a value at each area of the screw on the basis of the various input data described above (heating cylinder data, screw data, resin filling data, and the like, in particular). Specifically, external energy is first calculated from the condition data and the heating cylinder data at the time of injection molding, and the plasticization time is calculated from the resin data information and the screw data information. It should be noted that, in a case in which the plasticization time is actually measured, the plasticization time is not calculated. Then, a solid phase ratio (solid phase rate: melted state) of the resin at each area of the screw is computed by a convergence computation of Equation A and Equation B described below, which expand the Tadmor model formula to an injection theoretical formula. It should be noted that, in this computation, in addition to the heating cylinder data information, the screw data information, the molding machine data information, and the resin data information used in the calculation of external energy and the calculation of plasticization time, the plasticization time is also added in the calculation when necessary. By connecting the estimated solid phase rates obtained in this way with each screw area set on the horizontal axis, it is possible to obtain the estimated solid phase rate computation result composed of the profile form shown in FIG. 1A and the like.

[Formula 1]

$$\delta = \left\{ \frac{(2 \cdot km(Tb - Tmo) + Va) \cdot X}{Vbx \cdot Vb \cdot pm(Cs(Tmo - Tro) + \lambda)} \right\}^{\frac{1}{2}} \quad \text{EQUATION A}$$

$$\Phi = f(Gm, Gc, Vbx, Vb, pm, km, Tb, Tmo, Va, Cs, Tro, \lambda) \quad \text{EQUATION B}$$

Where, $Va = 2 \cdot \eta o \times V_j^{n+1} \times \delta$ $$\delta^{1-n} \frac{(e^{-b'} + b' - 1)}{(b')^2} \left( \frac{b'}{1 - e^{-b'}} \right)^{n+1}$$

It should be noted that the Equation A and the Equation B described above are Tadmor model formulas, which exist as extrusion theoretical formulas, expanded to injection theoretical formulas, where $\delta$ is melt film thickness, km is thermal conductivity of melt, Tb is heating cylinder temperature, Tmo is melting point, Tro is solid pellet temperature, Va, Vb are coefficients suggesting melting speed, $\Phi$ is quantity suggesting melting speed, X is solid bed width, Vbx is peripheral velocity component in screw width direction, Cs is solid specific heat, $\rho m$ is liquid density, $\lambda$ is latent heat, Gm is plasticizing capacity taking into account cycle time, $\eta o$ is zero shear viscosity, n is viscosity index, and Vj is relative speed. It should be noted that the molten resin is assumed to be dependent on exponential law fluid, and b' denotes an amount due to the exponential law fluid.

Display Unit

The display unit displays a decision index in accordance with the value of the estimated solid phase rate computed by the above-described computation unit. With this display unit, it is possible to present an index for determining whether or not a condition at the time of injection filling is a condition that places the resin material in an appropriate plasticized state. In particular, each condition is set as basic information and the estimated solid phase rates obtained by the proprietary injection theoretical formula are utilized to display whether or not the estimated solid phase rate is an appropriate value (for example, 0 or a value close to 0) as a decision index. In this way, a decision index can be displayed in an extremely short time (for example, 0.1 second or less), and that decision index can be used as an effective decision-making factor by the work operator. Then, when the basic information is used as a specific condition currently being performed or about to be performed, the information can be utilized to determine the level of the condition.

The estimated solid phase rate displayed is an estimated solid phase rate of the resin material at the screw tip end, and determining whether or not the estimated solid phase rate of the resin material at the screw tip end is an appropriate value (for example, 0 or a value close to 0) is the decision index.

The display unit, as illustrated in FIG. 1A to FIG. 3B, displays the estimated solid phase rate as a profile composed of two or more estimated solid phase rates including at least a first estimated solid phase rate of the resin material at the screw tip end and a second estimated solid phase rate of the resin material not at the screw tip end. In this way, when the basic information composed of various data is used as a specific condition currently being performed or about to be performed, it is possible to view the displayed profile composed of two or more estimated solid phase rates and thus utilize the information to determine the level of the condition. Although the display unit may display only the first estimated solid phase rate and the second estimated solid phase rate, or may display even other estimated solid phase rates, according to this invention, the estimated solid phase rates including the first estimated solid phase rate and the second estimated solid phase rate may be displayed as a profile in whole or may be displayed as a profile in part, thereby making it possible for the work operator to easily check the information visually.

Estimated Solid Phase Rate

Figure 4:
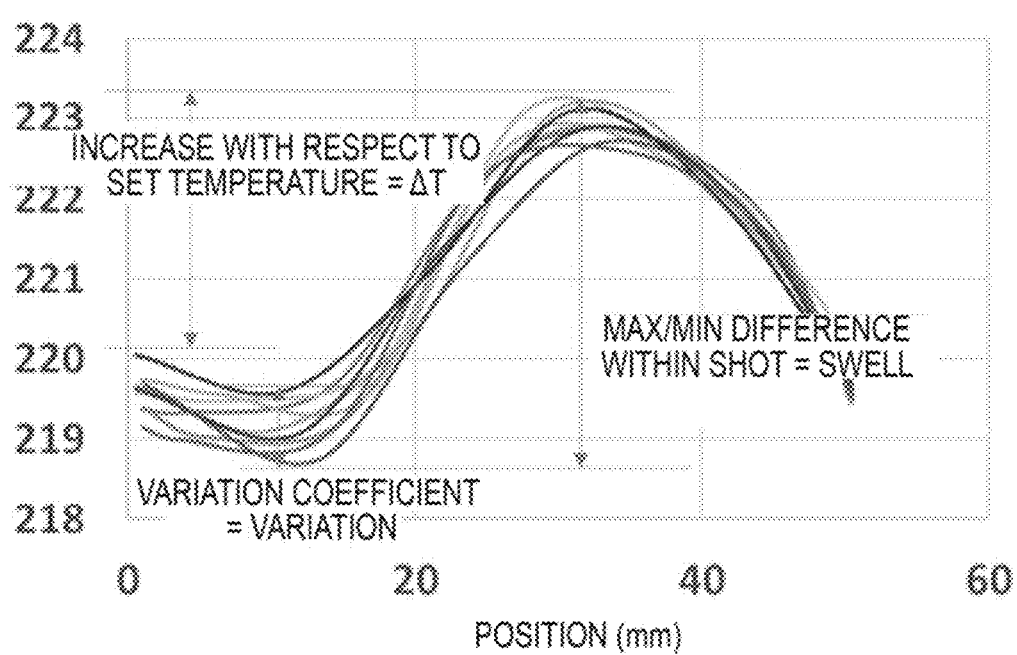
FIG. 4 is an explanatory view indicating measurement results of the resin temperature when the substitute mold was injection-filled, and the terms "swell," "variation," and "ΔT" based on those results.

The estimated solid phase rate will now be described in more detail. FIG. 4 shows the result of resin temperature measurements obtained from a device that measures resin temperatures at each area in the screw, with the resin temperatures measured at each area in the screw per injection filling shot superimposed. In this resin temperature measurement result, as shown in FIG. 4, a magnitude of a maximum temperature and a minimum temperature at each position shown on the horizontal axis is referred to as "swell," a value obtained by dividing the standard deviation of an average value of the shots by the average value is, as a variation index of the superimposed resin temperature measurement result, referred to as "variation (variation coefficient)," and a maximum increase in temperature relative to the set temperature (220.2° C. in the example in FIG. 4) is referred to as "ΔT." In order to display the resin temperature measurement result of the resin material ejected from a nozzle at the screw tip end, such resin temperature measurements are made by using a substitute mold, not the mold used for actual injection molding. In FIG. 4, the X axis is the screw position and the Y axis is the resin temperature measured by a resin temperature measuring device. A certain degree of correlation can be confirmed between "swell" and "variation." Accordingly, in order to obtain a favorable injection-molded product, the resin material at the time of injection filling must be in an appropriate plasticized state (cleanly melted state), that is, in a state with little "swell" and little "variation."

Figure 2A:
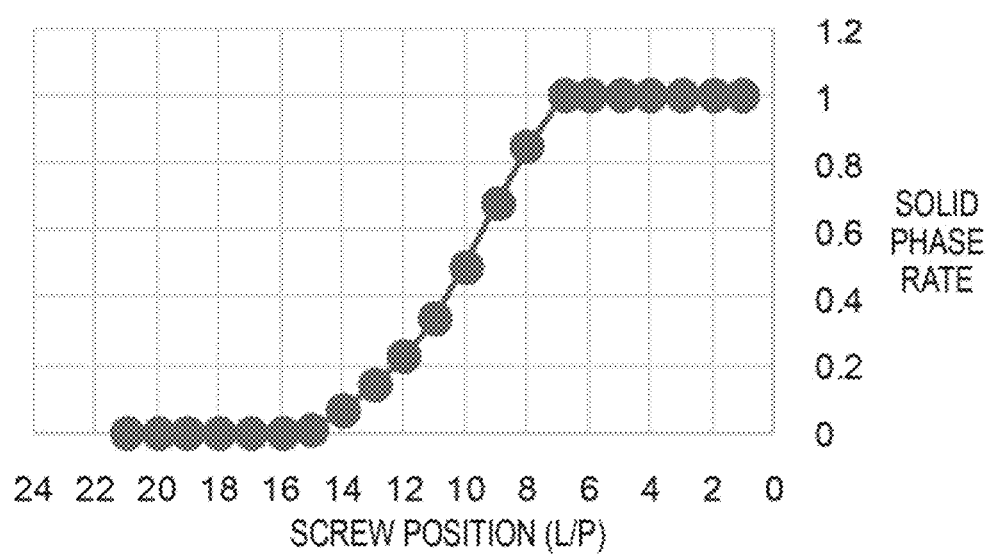
FIGS. 2A and 2B respectively show, when a substitute mold is injection-filled under conditions of experiment 2, an estimated solid phase rate computation result indicating an inappropriate plasticized state of a resin material, and measurement results of a resin temperature when the substitute mold was injection-filled.
Figure 3A:
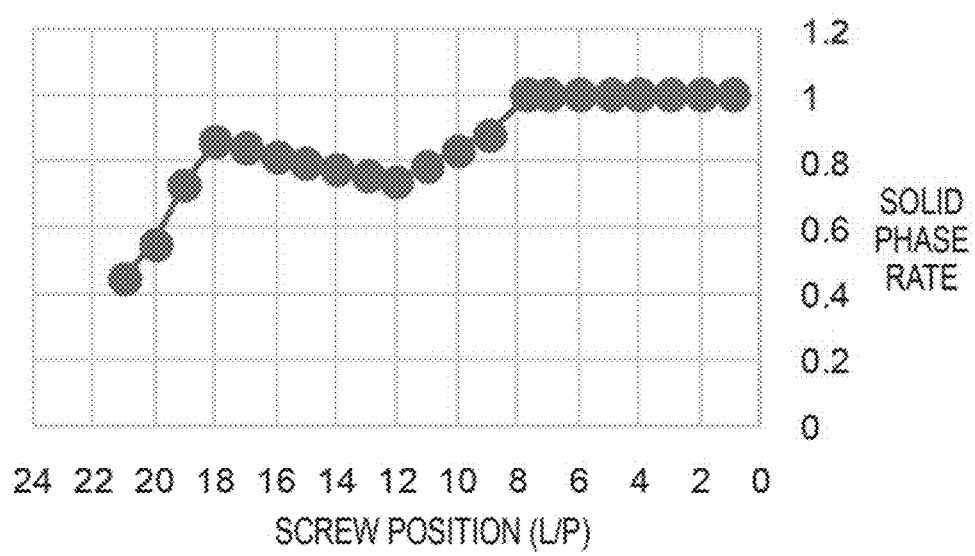
FIGS. 3A and 3B respectively show, when a substitute mold is injection-filled under conditions of experiment 3, an estimated solid phase rate computation result indicating an inappropriate plasticized state of a resin material, and measurement results of a resin temperature when the substitute mold was injection-filled.

In the present invention, the index for determining whether or not the resin material is in this "appropriate plasticized state" can be determined in the form of an estimated solid phase rate computation result composed of the profile form, as shown in FIG. 1A, FIG. 2A, and FIG. 3A. FIG. 1A, FIG. 2A, and FIG. 3A show the estimated solid phase rates at each position in the screw at the time of injection filling, calculated by a computation based on the input above-described basic information (resin data, melt flow rate (MFR) data, screw data, heating cylinder data, injection filling conditions, and the like), on the vertical axis. It should be noted that, in FIG. 1A, FIG. 2A, and FIG. 3A, a larger screw position number on the X axis indicates a position closer to the tip end side of the screw. The position of "0" on the X axis indicates a center of the hopper. On the other hand, an estimated solid phase rate of "1" on the Y axis indicates that the resin material is in a completely solid state, and "0" indicates that the resin material is in a completely melted state.

Figure 2B:
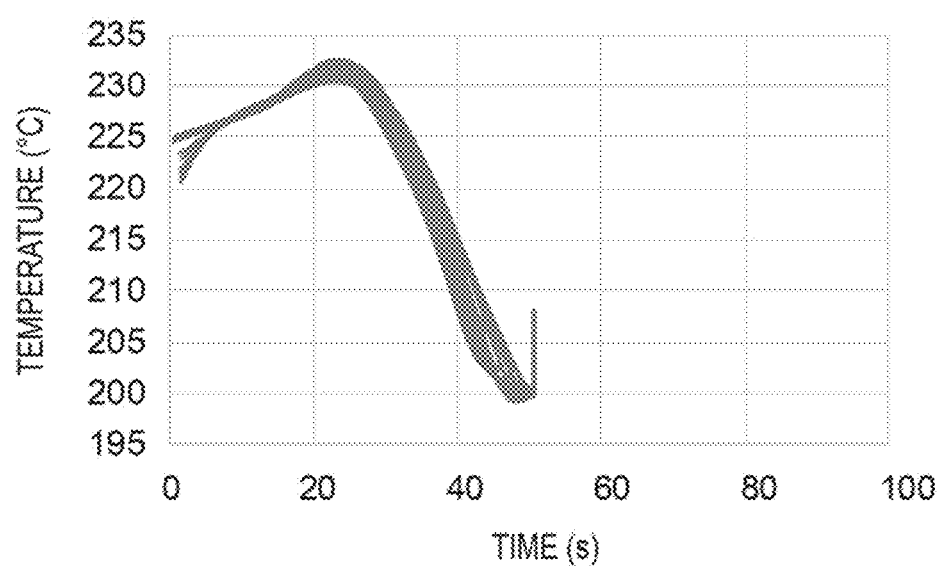
Figure 3B:
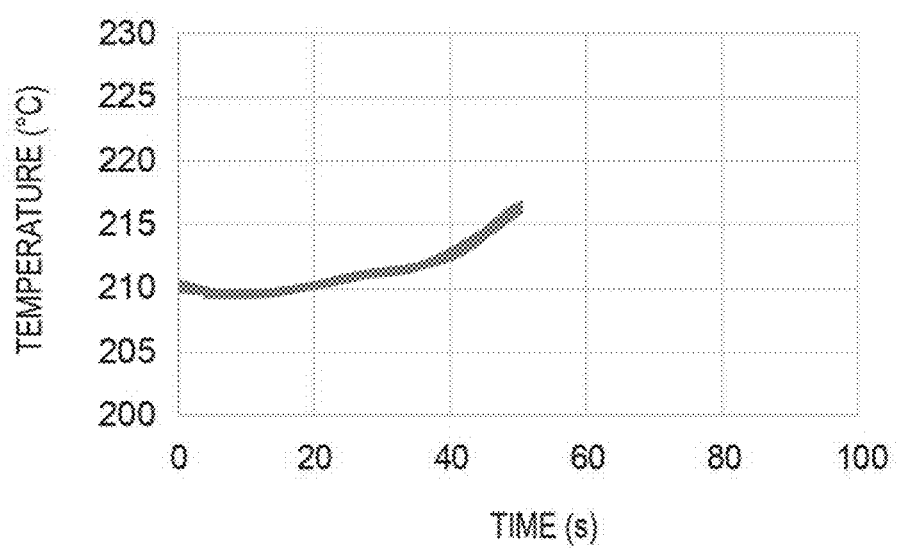

The estimated solid phase rate computation result in FIG. 2A shows the result when the resin material is melted too quickly. FIG. 2B shows the result of actual measurements taken at each area by the resin temperature measuring device in a case in which the set temperature is 220.2° C., and shows that the resin temperature has a large calorific value ΔT and large "swell" and "variation," and the resin material is not in an "appropriate plasticized state." Further, the estimated solid phase rate computation result in FIG. 3A is a measurement result indicating that the resin material is not completely melted at each area. FIG. 3B shows the result of actual measurement at each area by the resin temperature measuring device in a case in which the set temperature is 220.2° C., shows that the resin temperature has a largely negative calorific value ΔT and large "swell" and "variation," the plasticization time is also long, and there is instability. In this case as well, as in FIGS. 2A and 2B, the graph shows that the resin material is not in an "appropriate plasticized state."

Figure 1B:
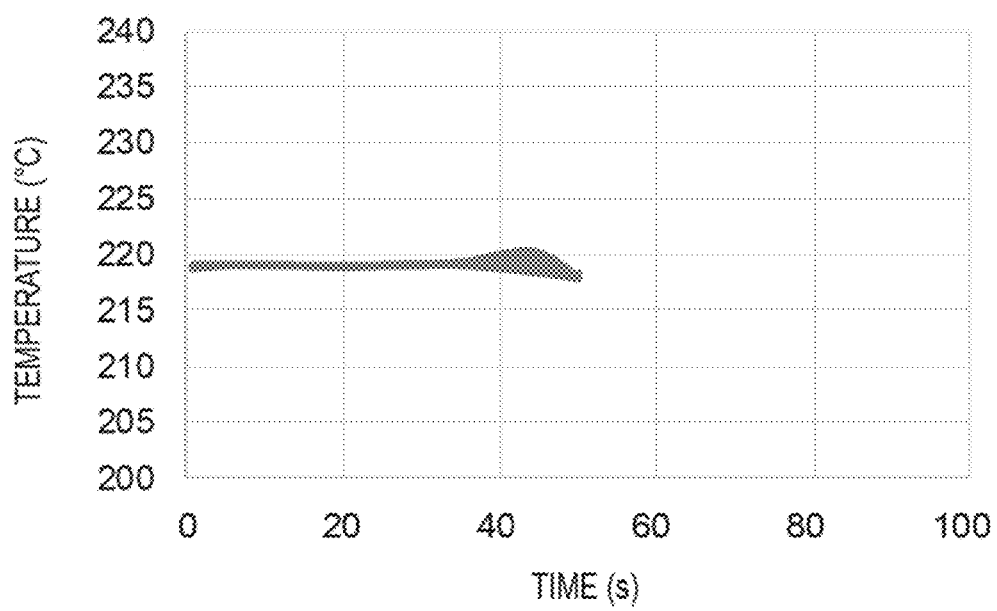

On the other hand, the estimated solid phase rate calculation result in FIG. 1A is a measurement result indicating that the resin material is completely melted at the screw tip end. FIG. 1B shows the result of actual measurement at each area taken by the resin temperature measuring device in a case in which the set temperature is 220.2° C., and shows that the "swell" and the "variation" are significantly improved. Such a state can be referred to as an "appropriate plasticized state."

Figure 6:
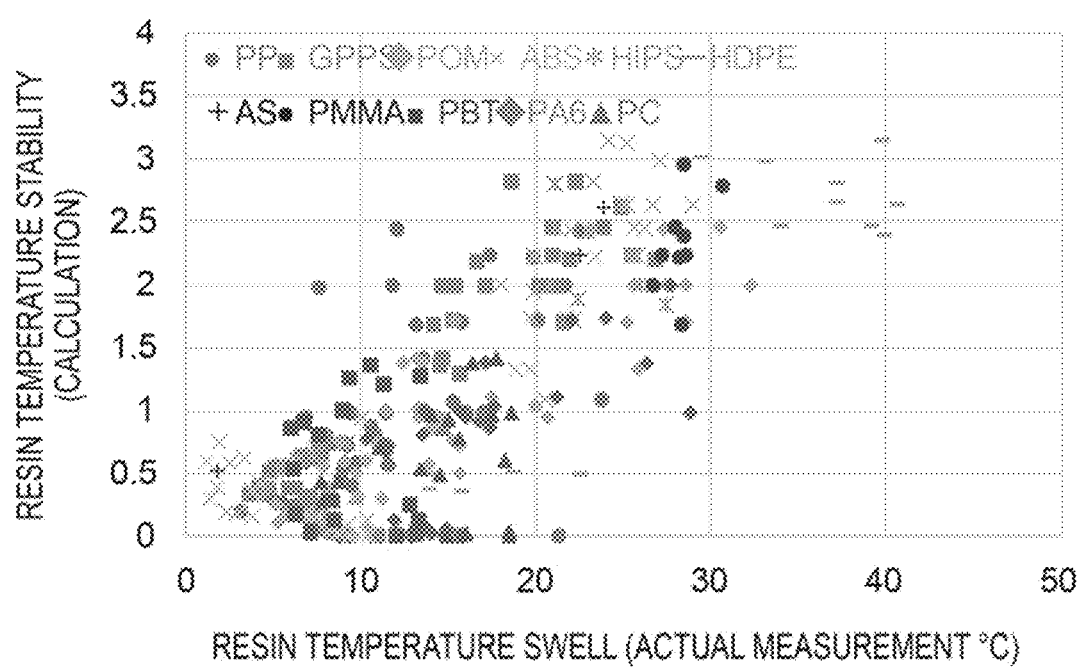
FIG. 6 is an explanatory view showing a relationship between actual measurement values of the swell of the resin temperature (horizontal axis) and resin temperature stability (vertical axis) calculated according to the flowchart in FIG. 5.

FIG. 6 is an explanatory view showing a relationship between actual measurement values of the swell of the resin temperature (horizontal axis) and resin temperature stability (vertical axis). The vertical axis of this graph is a value obtained by adding several times the value (multiplication factor is as desired) of the "estimated solid phase rate (dimensionless solution) at the screw tip end" (which is actually a value converted to the unmolten polymer fraction) on the Y axis of FIG. 1A to FIG. 3A to a value obtained by subtracting the "completely melted position" ("0" in a case of not being completely melted and in a case of the solid phase rate at the screw tip end being "0") from the "screw tip end position" on the X axis of FIG. 1A to FIG. 3A. The horizontal axis indicates the actual measurement result of the "swell" described in FIG. 4. FIG. 6 shows a plot of the values. The plasticized state can be determined to be appropriate to the extent that the value is small. The graph shows that resin temperature stability on the vertical axis has a correlation with the measured "swell." Smaller values on the vertical and horizontal axes indicate a more stable resin temperature stability. FIG. 6 shows a correlation (r=0.77 vs. r=0.79; the correlation increases as the value approaches 1) similar to that of the "appropriate plasticized state," conventionally expressed by the three factors of calorific value, black spot occurrence rate, and unmolten polymer fraction. As a result, it is possible to determine whether or not the resin material is in an "appropriate plasticized state," according to the form of the estimated solid phase rate computation result shown in FIG. 1A to FIG. 3A, and to quantify the state of the estimated solid phase rate in a decision index.

Table 1 shows the calculated values and the actual measurement values of the calorific value ΔT and the calculated values and the actual measurement values of the resin temperature stability in the case of FIG. 2B. Table 2 shows the calculated values and the actual measurement values of the calorific value ΔT and the calculated values and the actual measurement values of the resin temperature stability in the case of FIG. 1B. With a smaller value of the resin temperature stability indicating a more "appropriate plasticized state," the indices defining a value of the resin temperature stability of less than 0.1 as "excellent," 0.1 or more and less than 0.5 as "good," 0.5 or more and less than 1.0 as "acceptable," and 1.0 or more as "not acceptable" are set, making decision possible.

TABLE 1

|  | Calculation | Actual measurement |
|---|---|---|
| Calorific value ΔT (° C.) | 17.00 | 21.92 |
| Resin temperature stability (dimensionless/° C.) | 19.4 | 20.79 |

TABLE 2

|  | Calculation | Actual measurement |
|---|---|---|
| Calorific value ΔT (° C.) | 3.33 | −0.68 |
| Resin temperature stability (dimensionless/° C.) | 0.4 | 1.4 |

The decision index displayed on the display unit is displayed by a value as the dimensionless resin temperature stability described above. In this way, the displayed resin temperature stability can be used as a decision index, and the plasticized state can be determined to be appropriate to the extent that the value of the resin temperature stability is small.

It should be noted that, in the related art (technique of Patent Document 3), to change from the state of the estimated solid phase rate computation result shown in FIG. 2A and FIG. 3A to the state of the estimated solid phase rate computation result shown in FIG. 1A, it is necessary to ascertain the estimated solid phase rate that achieves the optimum plasticized state by changing each setting value little by little. To this end, it is necessary to refer to the computation results while changing the setting conditions one at a time. Further, the injection molding machine in the related art does not display the "estimated solid phase rate" on an operation screen or cannot quantify the "appropriate plasticized state." In contrast, in the injection molding support device of the present invention, by setting each screw area on the horizontal axis and connecting the estimated solid phase rates obtained by calculation with the heating cylinder data information, the screw data information, the molding machine data information, and the resin data information used in the calculation of external energy and the calculation of plasticization time, and, if necessary, additionally the plasticization time as described above, it is possible to obtain a decision index of the estimated solid phase rate and the resin temperature stability shown in FIG. 1A and the like in a short time. The time for these computations can be shortened to 0.1 seconds or less.

As described above, this injection molding support device for molding condition confirmation can present an index for determining whether or not a condition at the time of injection filling is a condition that places the resin material in an appropriate plasticized state. In particular, by setting each condition as basic information and determining, as a decision index, whether or not the estimated solid phase rate of the resin material at a screw tip end is an appropriate value (for example, 0 or a value close to 0) utilizing the estimated solid phase rates obtained by the proprietary injection theoretical formula, it is possible to present the decision index in an extremely short time (for example, 0.1 seconds or less), and use the decision index as an effective decision-making factor for a work operator.

Process Flow

Figure 5:
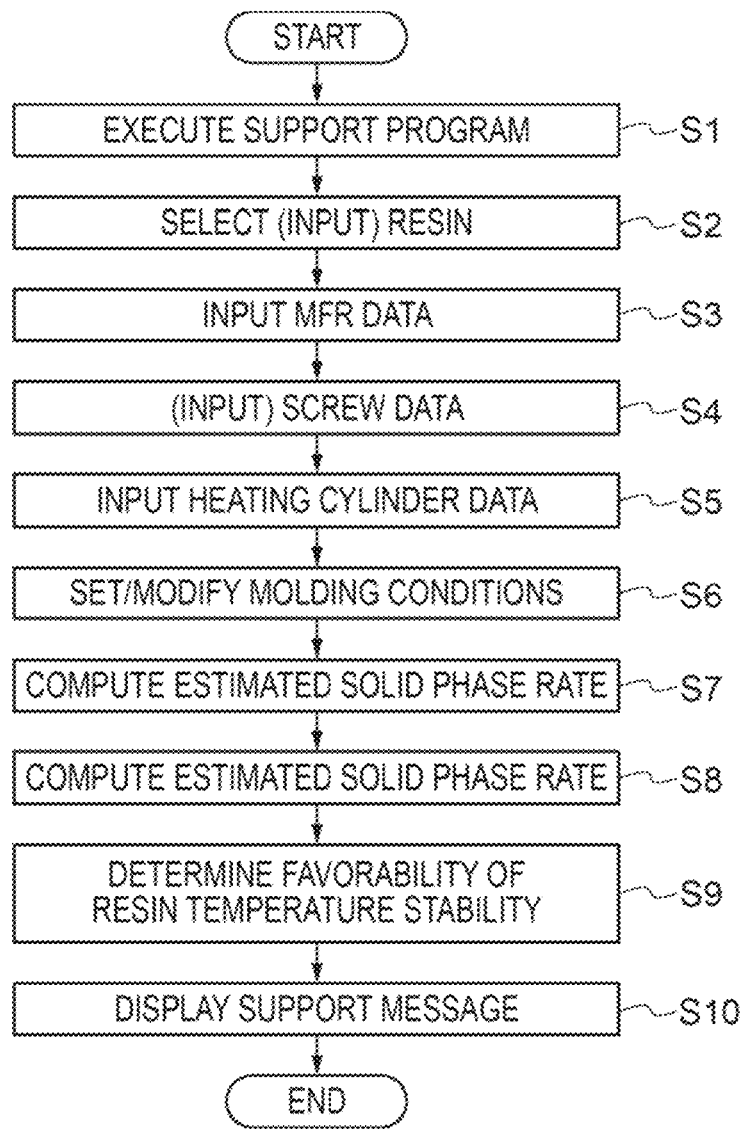
FIG. 5 is a flowchart for determining a favorability of resin temperature stability on the basis of estimated solid phase rates obtained by setting each condition as basic information.

FIG. 5 illustrates a flowchart for determining in a short time, by using the injection molding support device for molding condition confirmation, whether or not setting conditions for placing the resin material at the time of injection filling in a plasticized state are appropriate values.

First, a support program is executed (S1). Next, the operator inputs resin material data related to the resin material from an input screen (first setting unit) displayed on a display (S2). In a case in which the input screen displays a resin selection part enabling selection of the type of resin material, the resin material to be used is selected therefrom. On the basis of that selection, the resin material data registered in the internal memory in advance is set as the input data. Further, MFR data of the resin material to be used is input (S3). Next, the screw data is input (S4). When the screw data is input, individual dimension information, screw material, and the like may be entered numerically or by selection from a screw data input screen, or may be set automatically from screw data registered in advance by selecting a model number or the like provided on the screw from an input screen display. Next, the heating cylinder data is input (S5). When the heating cylinder data is input, individual dimension information, material, control point positions, heater length, heater position, wattage, and the like may be input numerically or by selection from a heating cylinder data input screen, or may be set automatically from heating cylinder data registered in advance by selecting a model number or the like provided on the heating cylinder from an input screen display.

After the basic information described above is set (input), the operator sets the molding conditions according to a regular setting procedure (S6). The molding conditions can be set using a molding condition setting screen. The set molding conditions are set as molding condition data. Other input processing necessary for molding preparation is then performed, completing the settings (inputs) related to the necessary basic information.

After the molding conditions are set, a predetermined support start key (not illustrated) is set to ON. For this reason, the computation processing of executing the above-described Equation A and Equation B, which expand the Tadmor model formula to the injection theoretical formula, is executed, and the estimated solid phase rate at each area of the screw is computed on the basis of the set basic information (S7). The estimated solid phase rates are then used to be connected with each screw area set on the horizontal axis, making it possible to obtain the estimated solid phase rate computation result by connecting the results (S8).

From the results of the estimated solid phase rates computed, as described above, a value of dimensionless resin temperature stability is computed, and favorability is determined by setting indices defining the value of resin temperature stability as "excellent" if less than 0.1, "good" if 0.1 or more and less than 0.5, "acceptable" if 0.5 or more and less than 1.0, and "not acceptable" if 1.0 or more, for example (S9). The favorability determination is displayed on the display unit as a support message (S10). Thus, it is possible to present an index for determining whether or not conditions at the time of injection filling are conditions that place the resin material in an appropriate plasticized state.

Injection Molding Support Device for Optimum Condition Presentation

Setting Unit/Second Setting Unit

The setting unit (second setting unit) is a portion that sets, of the basic information of the first setting unit described above, the basic information including at least the resin material data related to the resin material, the screw data related to the screw, and the heating cylinder data related to the heating cylinder, and sets constraint information related to a constraint condition for obtaining an optimum condition. The preceding "the resin material data related to the resin material, the screw data related to the screw, the heating cylinder data related to the heating cylinder," and the like may be used in combination with the above-described first setting unit, or may be provided using the second setting unit as a dedicated setting unit. The resin material data, the screw data, the heating cylinder data, and the like are the same as those described for the first setting unit. The constraint condition for obtaining the optimum condition is a condition set in place of the "filling condition at the time of injection filling" in the first setting unit. Examples of this constraint condition include screw revolution speed (rpm), back pressure (MPa), measurement position (mm) of resin material, cycle time (seconds) of injection filling, injection time (seconds) of resin material, set temperature (° C.) of each area of the screw 3, drop inlet set temperature (° C.), hopper set temperature (° C.), plasticization time (seconds), and the like, such as shown in FIG. 9.

This second setting unit may be provided in combination with the first setting unit set by the injection molding support device for molding condition confirmation described previously, or the second setting unit set by the injection molding support device for optimum condition presentation may be provided alone. FIG. 9 is an example, and the second setting unit is not limited to this form. In a case in which the first setting unit and the second setting unit are provided in combination, the various data can be respectively set in the first setting unit and the second setting unit as necessary, making it possible to input the constraint conditions in accordance with specifications, such as the characteristics of the injection molding machine and the type of resin material, and support the decision-making of the work operator on the basis of the optimum conditions presented as the conditions suitable for the specifications.

In the second setting unit shown in FIG. 9, the "Optimum Mathematical System" is a display for selecting whether to use or not use the high-speed computation method and, in a case in which "Do not use" of the selections "Do not use" and "Use" is selected, performs computations by the high-speed computation method without using those conditions and only using the other conditions for which "Use" is selected. On the other hand, in a case in which "Use" is selected, the second setting unit performs computations by the high-speed computation method using the selected conditions and excluding the conditions for which "Do not use" is selected. Further, in FIG. 9, "Min" and "Max" under "Constraint Condition" are areas in which the minimum value and the maximum value of the condition are input, and mean that the computation is performed within the range of the minimum value and the maximum value by the high-speed computation method. Accordingly, computations are performed by the high-speed computation method within the range of the upper and lower limits of the conditions set by the second setting unit.

This second setting unit is also preferably provided on a display panel, similarly to the description of the first setting unit. As the type of display panel as well, the same as that described for the first setting unit can be applied.

Computation Unit

The computation unit is a portion that computes the estimated solid phase rate of the resin material on the basis of the basic information and the constrain information by the high-speed computation method using the optimum mathematical processing system. The estimated solid phase rate computed by this computation unit is obtained by using the estimated solid phase rate obtained by computation on the basis of the basic information and the constrain information, as illustrated in the flowchart in FIG. 8. In this way, it is possible to utilize the optimum conditions displayed within the ranges of such information as a decision index during actual molding. Of the input basic information and constraint information, the optimum conditions are computed within the ranges of the constraint information.

The optimum mathematical processing system is a processing system that calculates the optimum estimated solid phase rate under specific conditions. Specifically, the system performs computations for setting only the value of the estimated solid phase rate of the resin material at the screw tip end (referred to as a first estimated solid phase rate in this application) to 0 or close to 0. With such computations, it is possible to calculate injection filling conditions that set only the value of the first estimated solid phase rate to 0 or close to 0. The calculated injection filling conditions are the optimum conditions for injection filling. The "optimum conditions" can be defined as the conditions in a case in which the plasticized state of the resin material is at the above-described solid phase rate (0 or substantially 0). Here, the first estimated solid phase rate is the estimated solid phase rate at the screw tip end position, and the estimated solid phase rate at the screw tip end position being 0 or substantially 0 and the estimated solid phase rates at locations other than that of the first estimated solid phase rate (referred to as the second estimated solid phase rates in this application) being not 0 or not substantially 0 indicates an "optimum plasticized state."

In the present invention, the high-speed computation method by the optimum mathematical processing system was applied as the method of computing conditions for an "appropriate plasticized state." Although mathematical programming method was applied as the high-speed computation method, the mathematical programming method is broadly classified into linear and nonlinear analysis. With this injection molding, nonlinear analysis must be used to derive optimum conditions. It should be noted that there are many methods for nonlinear analysis, such as the sequential search method, the golden section method, the steepest descent method, and the Newton method. In addition, there are the penalty function method, the sequential quadratic programming method, and the like, which take into account constraint conditions as well. However, all of these are still in the developmental stage, with high accuracy but slow computation time, medium accuracy but fast computation time, and the like. It should be noted that, although the algorithm for nonlinear analysis is difficult compared to that for linear analysis, the optimum mathematical system applied in the present invention is an improved version of the Lagrange multiplier method, and the optimum conditions were computed by nonlinear analysis. The mathematical solution of the optimization method is described below.

The conditions for injection filling are subject to various constraints depending on the specifications of the applied injection molding machine. The computed value of resin temperature stability calculated under such constraint conditions is applied to equation (1) described below to calculate a polynomial expression. The quadratic polynomial approximation of this equation (1) is determined by equation (2) described below. At this time, the partial differentiations of a, b, and c are set to 0. Thus, the partial differentiation of a is the result of equation (3) described below. Similarly, partial differentiation is performed for b and c as well. As a result of these, the normal equation of equation (4) described below can be obtained. After the solutions of a, b, and c are found, an approximation is found as f≈fα. The optimum solution is then calculated for the constraint condition g by utilizing the Lagrange multiplier method in equation (5) described below.

[Formula 2]

$$f_\alpha \cong ax_\alpha^2 + bx_\alpha + c \quad (1)$$

$$J = \frac{1}{2}\sum_{\alpha=1}^{N}(f_\alpha - (ax_\alpha^2 + bx_\alpha + c)) \to \min \quad (2)$$

$$\frac{\partial J}{\partial a} = \quad (3)$$

$$\sum_{\alpha=1}^{N}(f_\alpha - ax_\alpha^2 - bx_\alpha - c)(-x_\alpha^2) = a\sum_{\alpha=1}^{N}x_\alpha^1 + b\sum_{\alpha=1}^{N}x_\alpha^3 + c\sum_{\alpha=1}^{N}x_\alpha^2 - \sum_{\alpha=1}^{N}x_\alpha^2 f_\alpha$$

$$\begin{pmatrix} \sum_{\alpha=1}^{N}x_\alpha^4 & \sum_{\alpha=1}^{N}x_\alpha^3 & \sum_{\alpha=1}^{N}x_\alpha^2 \\ \sum_{\alpha=1}^{N}x_\alpha^3 & \sum_{\alpha=1}^{N}x_\alpha^2 & \sum_{\alpha=1}^{N}x_\alpha \\ \sum_{\alpha=1}^{N}x_\alpha^2 & \sum_{\alpha=1}^{N}x_\alpha & \sum_{\alpha=1}^{N}1 \end{pmatrix} \begin{pmatrix} a \\ b \\ c \end{pmatrix} = \begin{pmatrix} \sum_{\alpha=1}^{N}x_\alpha^2 f_\alpha \\ \sum_{\alpha=1}^{N}x_\alpha f_\alpha \\ \sum_{\alpha=1}^{N}y_\alpha \end{pmatrix} \quad (4)$$

$$\nabla f = \lambda \nabla g \quad (5)$$

For the calculation of the optimum solution, in a case in which the completely melted position is much closer to the hopper than the screw tip end position due to a large calorific value and large swell and variation, as shown in the estimated solid phase rate computation result in FIG. 2A, for example, the optimum conditions were derived by setting the constraint conditions shown in FIG. 9. At this time, computations were performed and the optimum solution was calculated using, as the constraint conditions shown in FIG. 9, a revolution speed of 60 to 200 rpm, a back pressure of 5 to 25 MPa, a cycle time of 50 to 55 seconds, an injection time of 5 to 20 seconds, a set temperature of each heating cylinder (here for five zones) of 180 to 220° C., and a drop inlet and hopper temperature of 25 to 100° C. It should be noted that, as the measurement position, no maximum or minimum constraint conditions were set and 50 mm was used.

Figure 7:
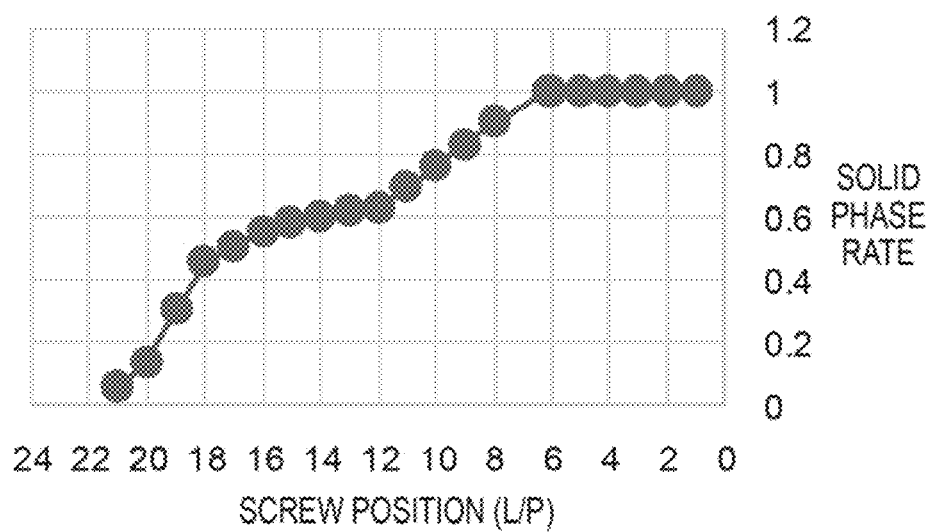
FIG. 7 shows an example of the estimated solid phase rates obtained based on computation of optimum conditions that achieve an appropriate plasticized state within ranges of constraint conditions by a high-speed computation method using an optimum mathematical processing system.

The optimum values of the conditions after computation, as shown in FIG. 10, were a revolution speed of 50 rpm, a back pressure of 10.3 MPa, a cycle time of 50 seconds, an injection time of 5 seconds, a set temperature of 220° C. (nozzle unit) to 215° C. (head part) to 210° C. (front portion) to 205° C. (center portion) to 200° C. (rear portion), a drop inlet temperature of 25° C., and a hopper temperature of 34.5° C. This FIG. 10 is a display example of the result of calculating, by using the high-speed computation method, the optimum conditions of the conditions at the time of injection filling that place the resin material in an "appropriate plasticized state," on the basis of the input information in the setting unit shown in FIG. 9. FIG. 7 shows, after input of these conditions once again, the estimated solid phase rates resulting from computation under these conditions. This estimated solid phase rate was substantially "0" at the screw tip end position and, when the conditions were set to those after computation, the estimated solid phase rate was displayed in the "appropriate plasticized state." Such computations were performed on the basis of formula obtained by improving the Lagrange multiplier method, increasing the accuracy of the optimum solution and making it possible to compute the setting conditions in a short time of 2 seconds or less.

Display Unit

The display unit displays a decision index in accordance with the value of the estimated solid phase rate computed by the above-described computation unit, similarly to the case of the injection molding support device for molding condition confirmation described previously. With this display unit, at the time of injection filling, the computation result obtained by performing computations within the ranges of the constraint conditions by the high-speed computation method using the optimum mathematical processing system can be presented as an effective decision-making factor for the work operator. The estimated solid phase rate displayed is an estimated solid phase rate of the resin material at the screw tip end, and whether or not the estimated solid phase rate of the resin material at the screw tip end is an appropriate value (for example, 0 or a value close to 0) is displayed as the decision index.

The displayed estimated solid phase rate is preferably displayed as a profile composed of two or more estimated solid phase rates including at least a first estimated solid phase rate of the resin material at the screw tip end and a second estimated solid phase rate of the resin material not at the screw tip end. In this way, it is possible to utilize the optimum conditions displayed within the ranges of the basic information and the constraint information as the decision index during actual molding. Although such a display unit may display only the first estimated solid phase rate and the second estimated solid phase rate, or may display even other estimated solid phase rates, according to this invention, the estimated solid phase rate including the first estimated solid phase rate and the second estimated solid phase rate may be displayed as a profile in whole or may be displayed as a profile in part, thereby making it possible for the work operator to easily check the information visually.

Figure 8:
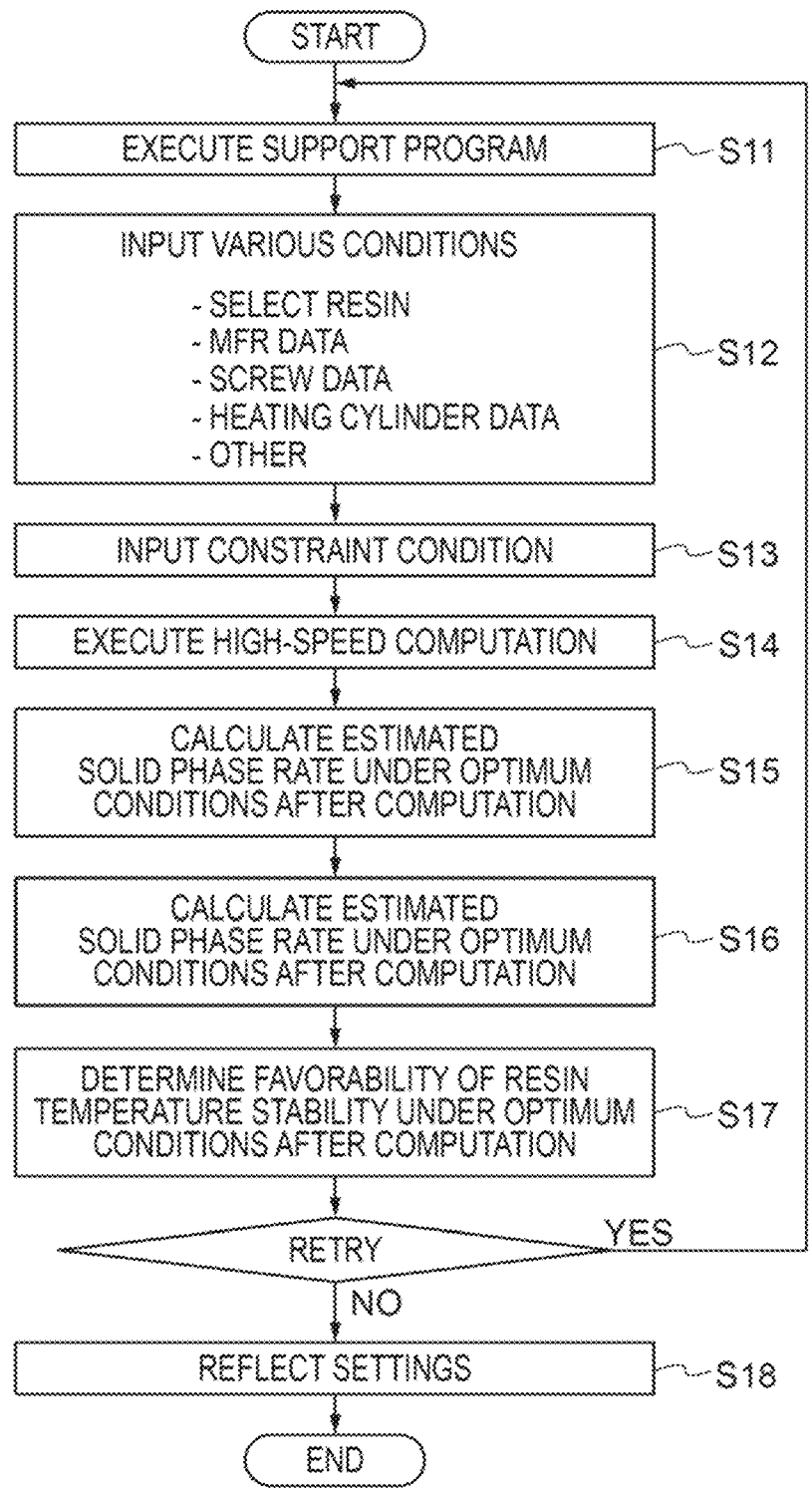
FIG. 8 is a flowchart for determining the favorability of resin temperature stability on the basis of estimated solid phase rates obtained by setting each condition as basic information and constraint information.

The decision index displayed on the display unit is displayed as dimensionless resin temperature stability. In this way, the displayed dimensionless resin temperature stability can be used as a decision index, and the plasticized state can be determined to be appropriate to the extent that the value of the resin temperature stability is low. As the decision indices, the favorability can be determined by setting indices defining the value of resin temperature stability as "excellent" if less than 0.1, "good" if 0.1 or more and less than 0.5, "acceptable" if 0.5 or more and less than 1.0, and "not acceptable" if 1.0 or more, for example. If determining the favorability once again is desired, the recomputation (retry) illustrated in FIG. 8 is executed. The estimated solid phase rate is recalculated as necessary, following "retry" determination step illustrated in FIG. 8. When the calculation is performed once again, the recomputation is performed upon changing the constraint conditions initially set. For the estimated solid phase rate after recomputation as well, the favorability is determined by the same indices as described above.

As described above, with the injection molding support device for optimum condition presentation, it is possible to compute the optimum conditions that achieve an appropriate plasticized state within the ranges of the constraint conditions by the high-speed computation method using the optimum mathematical processing system, and present a decision index in accordance with the determined result. In particular, computations are performed within the ranges of the constraint conditions by the high-speed computation method using the optimum mathematical processing system, making it possible to use the computation result as an effective decision-making factor for the work operator.

Process Flow

FIG. 8 illustrates a flowchart for calculating, by using the injection molding support device for optimum condition presentation, the optimum conditions for placing the resin material at the time of injection filling in an "appropriate plasticized state" and determining whether or not the calculated optimum conditions are appropriate values.

First, the support program is executed (S11). Next, the operator inputs various information from the input screen (first setting unit) (S12). Examples of the conditions include resin material data related to the resin material, MFR data, screw data, heating cylinder data, and the like. It should be noted that, in a case in which the input screen displays a selection part enabling selection of the various data, the data to be used is selected therefrom. By the selection, data registered in advance can be set as the input data. This is the same as in the case of the injection molding support device for molding condition confirmation described previously, and thus the description thereof will be omitted here.

Next, the constraint conditions are input into the second setting unit (S13). Examples of the constraint conditions include, but are not limited to, the conditions shown in FIG. 9. Next, high-speed computations are executed using the input basic information and constraint conditions (constraint information) (S14). High-speed computations are performed by the method obtained by improving the Lagrange multiplier method using Equation 1 to Equation 5, as described previously. Through such high-speed computations, the optimum conditions constituting the optimum solution are calculated.

Subsequently, as in the process flow illustrated in FIG. 5, the estimated solid phase rates are computed under the optimum conditions after computation (S15). The computation of the estimated solid phase rates is the same as that described for the injection molding support device for molding condition confirmation. The estimated solid phase rates obtained are then connected with each screw area set on the horizontal axis, making it possible to obtain the estimated solid phase rate computation result shown in FIG. 7 (S16). It should be noted that the estimated solid phase rate computed by the computation unit is obtained by using the estimated solid phase rate computed on the basis of the basic information and the constraint information. For this estimated solid phase rate, it is possible to utilize the optimum conditions displayed within the information ranges as a decision index during actual molding.

From the results of the estimated solid phase rates computed, as described above, a value of dimensionless resin temperature stability is computed, and the favorability is determined by setting indices defining the value of resin temperature stability as "excellent" if less than 0.1, "good" if 0.1 or more and less than 0.5, "acceptable" if 0.5 or more and less than 1.0, and "not acceptable" if 1.0 or more, for example (S17). The favorability determination is displayed on the display unit as a support message. Thus, it is possible to present an index for determining whether or not conditions at the time of injection filling are conditions that place the resin material in an appropriate plasticized state.

It should be noted that, as described previously, in a case in which it is desired to determine the favorability again, the recomputation (retry) illustrated in FIG. 8 is executed. The estimated solid phase rate is recalculated as necessary, following the "retry" determination step. When the calculation is performed again, the recomputation is performed upon changing the constraint conditions initially set. For the estimated solid phase rate after recomputation as well, the favorability is determined by the same indices as described above. Subsequently, as necessary, the obtained optimum conditions are reflected in the injection filling (S18). Thus, the optimum conditions in optimum computation mode under constraint conditions can be computed to determine favorability.

High-Speed Computation Process Flow

When the resin temperature stability is computed within a range of a constraint condition and the optimum solution of the quadratic function obtained by the Lagrange multiplier method exceeds the range of the constraint conditions, a quadratic function curve within the range of the constraint condition is determined as a linear function and the optimum value is calculated. As shown in FIG. 9, for example, the optimum solution can be obtained by computing the revolution speed, the back pressure, the measurement position, the cycle time, the injection time, the heating cylinder set temperature, the drop inlet temperature, and the hopper temperature as the constraint conditions, and displayed on a display panel.

Figure 11:
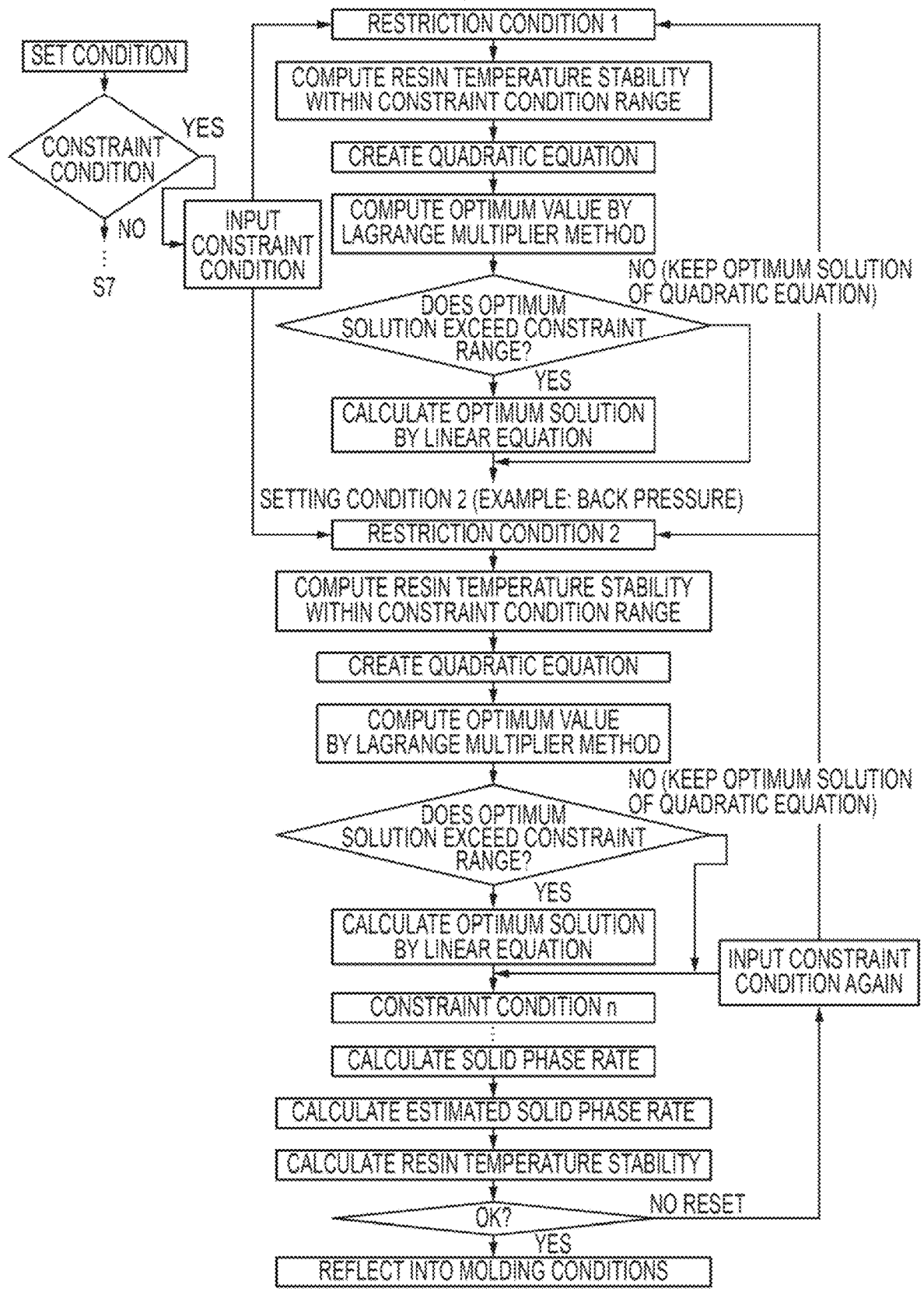
FIG. 11 is a flowchart for computing at high speed the optimum conditions within the ranges of the constraint conditions.

The high-speed computation process flow is illustrated in FIG. 11. As illustrated in FIG. 11, the conditions are first set in the setting unit. However, in a case in which there are no constraint conditions, S7 (computation of estimated solid phase rate) of FIG. 5 is executed, and subsequently processing is performed in each step of the molding condition confirmation mode illustrated in FIG. 5.

On the other hand, in a case in which there are constraint conditions, the constraint conditions are input (S13 of FIG. 8). Examples of the constraint conditions include revolution speed, back pressure, and the like, as illustrated in FIG. 11. For constraint condition 1, the resin temperature stability is computed within the constraint condition range to create a quadratic equation, and the optimum value is computed by the Lagrange multiplier method. At this time, in a case in which the optimum value does not exceed the constraint condition, the computation is then performed with the next constraint condition as is. However, in a case in which the optimum value exceeds the constraint condition, calculation of the optimum solution by the linear equation is performed.

Next, for constraint condition 2 as well, a computation similar to that for the above-described constraint condition 1 is performed, and subsequently the same is performed for constraint condition 3 and thereafter as well. After the optimum solution for each constraint condition is calculated, the solid phase rates are calculated on the basis thereof, the estimated solid phase rate computation result is calculated, and the resin temperature stability is calculated. The favorability of the result of that resin temperature stability is determined and, in a case in which the result is inadequate, resetting is performed. In the resetting, the constraint conditions are re-input and computation is performed again following the flow described above. In a case in which the resin temperature stability is determined to be favorable, the result is reflected in the molding conditions.

Injection Molding Machine

Figure 15:
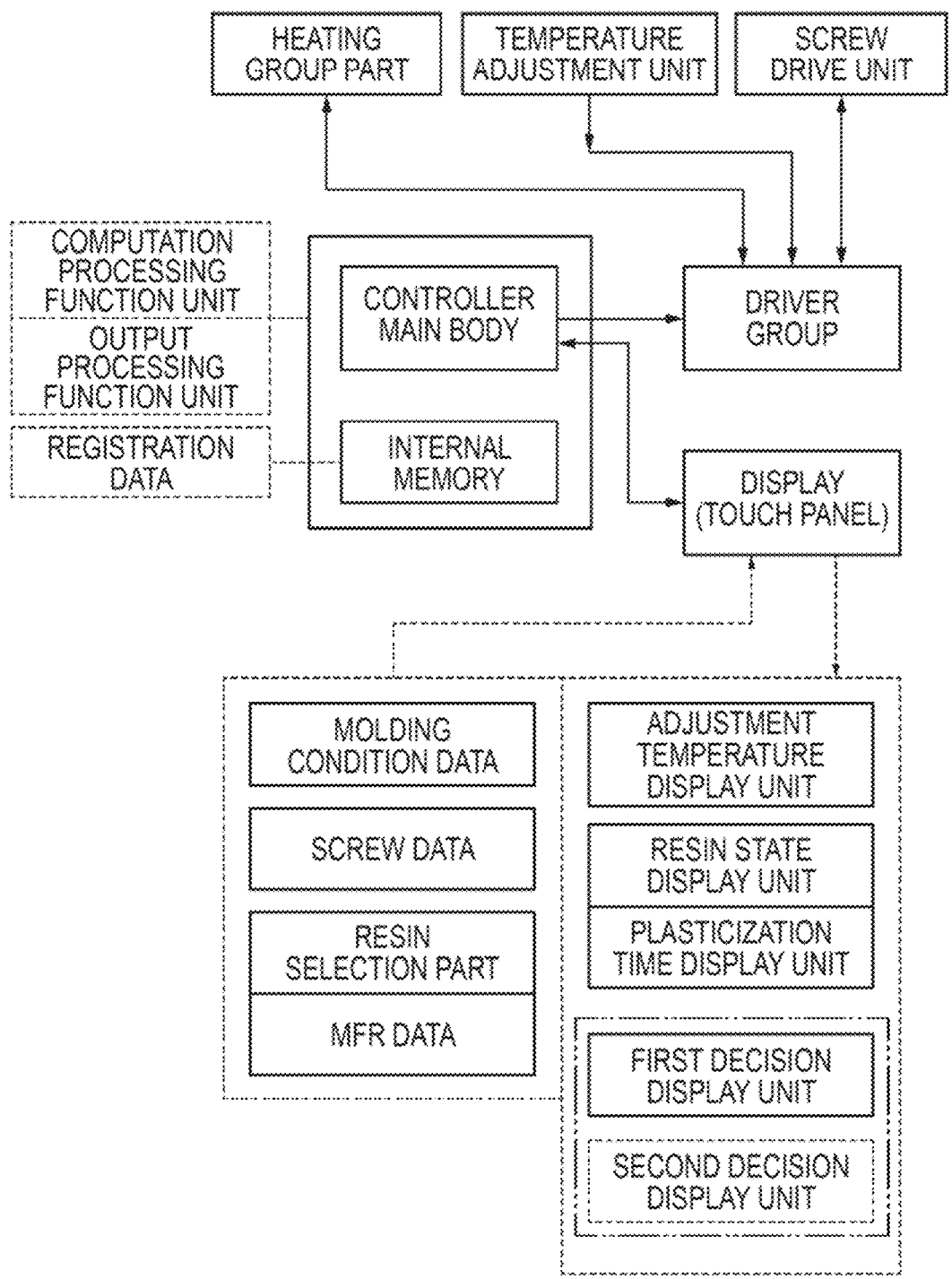
FIG. 15 is a block diagram illustrating a main configuration of an injection molding support device.

The injection molding machine 10 according to the present invention includes the injection molding support device according to the above-described present invention. FIG. 12 is a schematic diagram of the injection molding machine 10, FIG. 13 is an example of an injection mold, FIG. 14 is an example of a screw, and FIG. 15 is a block diagram illustrating the main components of the injection molding support device. The injection molding machine 10 described below is an example, and the injection molding machine not limited thereto.

The injection molding machine 10, as illustrated in FIG. 12, includes at least a machine base 11, and an injection device 12, a mold clamping device 13, the display device 14, and a control device 51 provided on the machine base 11. Covers 20, 29, 30 are provided to a drive unit of the injection device 12 and the mold clamping device 13. Although the example of FIG. 12 is a horizontal type of injection molding machine, the machine may be a vertical type of injection molding machine and is not particularly limited. Further, the drive system is also not limited, and may be an electric drive or a hydraulic drive.

The mold clamping device 13 is a device for performing mold clamping and mold opening and closing and, as a device having these functions, is referred to herein as the "mold clamping device 13." As illustrated in FIG. 13, the mold clamping device 13 includes the mold 2. The mold 2 is filled with a resin material injected from a nozzle tip end 4n (refer to FIG. 14) of a heating cylinder 17 provided to the injection device 12. In this mold clamping device 13, after the filled resin material is cooled and solidified, the mold 2 is opened and the molded product is extracted.

The mold clamping device 13 performs mold clamping (mold closing) and mold opening between a fixed mold 2a and a movable mold 2b. As illustrated in FIG. 13, mold clamping and mold opening are performed by advancing and retreating the movable mold 2b attached to a movable platen. The advancing and retreating of the movable mold 2b is performed by a conventionally known means for driving a mold clamping drive unit (not illustrated) and, using a toggle link 23 and a cross head 24, extending or bending the toggle link 23.

As illustrated in FIG. 12, the injection device 12 is mainly constituted by the heating cylinder 17 that plasticizes a resin material, a hopper 18 that stores the resin material supplied to the heating cylinder 17, and an injection mechanism 19. The screw 3 is provided in an interior of the heating cylinder 17. The resin material supplied from the hopper 18 into the interior of the heating cylinder 17 is heated by a heater 4 wrapped on an outer periphery, measured while being plasticized, fed to a tip end side by a rotating operation of the screw 3, and injected from a tip-end nozzle 5 with advancement of the screw 3. In the injection mechanism 19, a hydraulic driving device or an electric driving device is used as a driving power source. As illustrated in FIG. 14, the screw 3 provided in the heating cylinder 17 is operated by a rotating mechanism and an advancing and retreating mechanism. It should be noted that, in the screw 3, Zm refers to the metering zone and Zc refers to the compression zone.

FIG. 15 is a block diagram of each area for computing and displaying an "appropriate plasticized state" in the injection molding support device. The injection molding machine 10 according to the present invention includes the control device 51 (refer to FIG. 12) that controls the entire machine. As illustrated in the block diagram in FIG. 15, the control device 51 includes a controller main body provided with a computer function with built-in hardware such as a central processing unit (CPU), and an internal memory in which registration data including various data and programs are written. Further, the display is connected to a control device main body composed of the controller main body and the internal memory. The display displays necessary information and is provided with a touch panel, which is used to perform various input operations such as input, setting, and selection. Furthermore, a driver group that drives (operates) various actuators is connected to the control device main body. The driver group includes a temperature adjustment driver provided with a power feeding circuit and a temperature-adjustment water-circulation circuit, a power feeding driver, and a heater driver, illustrated in FIG. 14.

The control device includes a human-machine interface (HMI) control system and a programmable logic controller (PLC) control system, and a PLC program and an HMI program are stored in the internal memory. The PLC program executes sequence operations of various processes in the injection molding machine, the monitoring of the injection molding machine, and the like, and the HMI program executes the setting and display of operation parameters of the control device, the display of operation monitoring data of the control device, and the like. The configuration of such a control device is not limited to this form, and need only be a configuration similar to that of a general injection molding machine.

Although preferred embodiments have been described in detail above, the present invention is not limited to such embodiments, and the detailed configurations, shapes, elements, materials, quantities, numerical values, techniques, and the like can be changed, added, or deleted as desired without deviating from the gist of the present invention.

It should be noted that the injection molding support device according to the present invention and the injection molding machine equipped with this injection molding support device may enable operations (condition setting operations, optimization operations) of the setting unit (first setting unit, second setting unit) with a terminal (for example, a mobile communication terminal such as a smartphone, a personal computer, or the like) that can be connected via wireless communication (mobile communication network), or may enable such operations with a terminal that can be connected via both wireless communication and wired communication (fixed communication network). Such a terminal may display the same display screen as that of the display unit of the injection molding support device, or may display a modified display screen as the terminal display screen. Such a terminal may be configured to enable the same operations as those of the setting unit of the injection molding support device while the display screen is viewed. This way, the work operator does not have to look at the display screen of the injection molding support device beside the injection molding machine to set conditions, and can set conditions by viewing the display screen at a remote location while working on a remote office floor, while traveling to work, while teleworking at home, or the like. As a result, operators can diagnose conditions at various locations and optimize the system as needed, thus improving work efficiency.

DESCRIPTIONS OF REFERENCE NUMERALS

2 Mold
2a Fixed mold
2b Movable mold
3 Screw
4 Heater
5 Nozzle
6 Screw tip end
10 Injection molding machine
11 Machine base
12 Injection device
13 Mold clamping device
14 Display device
17 Heating cylinder
18 Hopper
19 Injection mechanism
20, 29, 39 Cover
23 Toggle link
24 Cross head
51 Control device
Zm Metering zone
Zc Compression zone

What is claimed is:
1. An injection molding device, comprising:
a screw;
actuators;
a mold, wherein the screw injection-fills a resin material into the mold; and
an injection molding support device capable of providing support in determining whether or not a condition at the time of injection filling is a condition that places the resin material in an appropriate plasticized state when the resin material, measured and plasticized, is molded by being injection-filled from a screw tip end of the screw into the mold, the injection molding support device comprising:
a setting unit that sets basic information including at least resin material data related to the resin material, screw data related to the screw, heating cylinder data related to a heating cylinder, and a constraint condition data related to the condition at the time of the injection filling;

a computation unit that computes an estimated solid phase rate of the resin material on the basis of the basic information and the constraint condition by a computation method; and a display unit that displays a decision index in accordance with a value of the estimated solid phase rate;

wherein the setting unit includes at least a first setting unit that sets one or two or more data selected from the basic information, and a second setting unit that sets whether or not the one or two or more data selected from the basic information is to be applied to the computation method as the constraint condition, and in a case in which the data is to be applied, sets a range of the constraint condition; and wherein the actuators are controlled so that the screw injection of the resin material into the mold is performed in accordance with the selected and set basic information.

2. The injection molding device according to claim 1, wherein
the estimated solid phase rate is the estimated solid phase rate of the resin material at the screw tip end.

3. The injection molding device according to claim 1, wherein
the estimated solid phase rate is displayed as a profile composed of two or more estimated solid phase rates including at least a first estimated solid phase rate of the resin material at the screw tip end and a second estimated solid phase rate of the resin material not at the screw tip end.

4. The injection molding device according to claim 1, wherein
the decision index displayed on the display unit is displayed as dimensionless resin temperature stability.

5. An injection molding device, comprising
a screw;
actuators;
a mold, wherein the screw injection-fills a resin material into the mold; and
an injection molding support device capable of presenting an optimum condition at the time of injection filling when a resin material, measured and plasticized, is molded by being injection-filled from a screw tip end of the screw into a mold, the injection molding support device comprising:
a setting unit that sets basic information including at least resin material data related to the resin material, screw data related to the screw, and heating cylinder data related to the heating cylinder, and sets constraint information related to a constraint condition for obtaining the optimum condition;
a computation unit that computes an estimated solid phase rate of the resin material on the basis of the basic information and the constraint information by a computation method using a mathematical processing system; and a display unit that displays a decision index in accordance with a value of the estimated solid phase rate;

wherein the setting unit includes at least a first setting unit that sets one or two or more data selected from the basic information, and a second setting unit that sets whether or not the one or two or more data selected from the basic information is to be applied to the computation method as the constraint condition, and in a case in which the data is to be applied, sets a range of the constraint condition;

wherein the actuators are controlled so that the screw injection of the resin material into the mold is performed in accordance with the selected and set basic information.

6. The injection molding device according to claim 5, wherein
the estimated solid phase rate is the estimated solid phase rate of the resin material at the screw tip end.

7. The injection molding device according to claim 5, wherein
the estimated solid phase rate is displayed as a profile composed of two or more estimated solid phase rates including at least a first estimated solid phase rate of the resin material at the screw tip end and a second estimated solid phase rate of the resin material not at the screw tip end.

8. The injection molding device according to claim 7, wherein
the computation unit performs a computation for setting only a value of the first estimated solid phase rate to 0.

9. The injection molding device according to claim 5, wherein
computation of the estimated solid phase rate is performed by a nonlinear analysis method.

10. The injection molding device according to claim 5, wherein
the computation unit recalculates the estimated solid phase rate on the basis of the estimated solid phase rate as necessary, and displays the recalculated estimated solid phase rate on the display unit.

11. The injection molding device according to claim 5, wherein
the injection molding support device is capable of providing support in determining whether or not a condition at the time of the injection filling is a condition that places the resin material in an appropriate plasticized state when the resin material, measured and plasticized, is molded, and
the setting unit sets condition data related to a condition at the time of the injection filling.

* * * * *